United States Patent
Kondo et al.

(10) Patent No.: US 9,532,379 B2
(45) Date of Patent: Dec. 27, 2016

(54) TRANSMITTER, TRANSMISSION METHOD USED BY THE SAME, RECEIVER FOR RECEIVING A RADIO SIGNAL FROM TRANSMITTER AND WIRELESS COMMUNICATION SYSTEM INCLUDING THE SAME

(71) Applicants: Advanced Telecommunications Research Institute International, Soraku-gun, Kyoto (JP); NEC Communication Systems, Ltd., Minato-ku, Tokyo (JP)

(72) Inventors: Yoshihisa Kondo, Soraku-gun (JP); Hiroyuki Yomo, Soraku-gun (JP); Suhua Tang, Soraku-gun (JP); Takatoshi Kimura, Soraku-gun (JP); Masahito Iwai, Minato-ku (JP); Tetsuya Ito, Minato-ku (JP)

(73) Assignees: ADVANCED TELECOMMUNICATIONS RESEARCH INSTITUTE INT, Kyoto (JP); NEC COMMUNICATION SYSTEMS, LTD., Kyoto (JP)

( * ) Notice: Subject to any disclaimer, the term of this patent is extended or adjusted under 35 U.S.C. 154(b) by 197 days.

(21) Appl. No.: 14/383,195

(22) PCT Filed: Mar. 4, 2013

(86) PCT No.: PCT/JP2013/055790
§ 371 (c)(1),
(2) Date: Sep. 5, 2014

(87) PCT Pub. No.: WO2013/137036
PCT Pub. Date: Sep. 19, 2013

(65) Prior Publication Data
US 2015/0043467 A1     Feb. 12, 2015

(30) Foreign Application Priority Data

Mar. 15, 2012 (JP) .............................. 2012-058562

(51) Int. Cl.
*H04W 74/08* (2009.01)
*H04W 52/02* (2009.01)
*H04L 27/00* (2006.01)

(52) U.S. Cl.
CPC ...... H04W 74/0808 (2013.01); H04L 27/0006 (2013.01); H04W 52/0245 (2013.01)

(58) Field of Classification Search
CPC .................. H04W 74/0808; H04W 52/0245; H04L 27/0006
See application file for complete search history.

(56) References Cited

U.S. PATENT DOCUMENTS

2004/0234000 A1* 11/2004 Page .................... H04J 3/00
375/259
2006/0114826 A1* 6/2006 Brommer .............. H04J 3/1682
370/230

(Continued)

FOREIGN PATENT DOCUMENTS

JP   03-268626 A   11/1991
JP   2004-064613 A   2/2004

(Continued)

OTHER PUBLICATIONS

Official Communication issued in International Patent Application No. PCT/JP2013/055790, mailed on Jun. 11, 2013.

(Continued)

*Primary Examiner* — Ajay Cattungal
(74) *Attorney, Agent, or Firm* — Keating & Bennett, LLP

(57) ABSTRACT

A receiver has an ID that includes three signal detection intervals ($S_1$, $S_2$, $S_3$). The three signal detection intervals ($S_1$, $S_2$, $S_3$) are detected as the receiver detects a signal (Continued)

consisting of a value larger than a threshold at each of the detection timings (DT1 to DT4). The transmitter transmits four radio frames (FR1 to FR4) such that each of the radio frames straddles the corresponding one of the detection timings (DT1 to DT4) in the receiver.

15 Claims, 22 Drawing Sheets

(56) References Cited

U.S. PATENT DOCUMENTS

| | | | | |
|---|---|---|---|---|
| 2009/0067356 | A1* | 3/2009 | Sakamoto | H04W 52/0229 370/311 |
| 2012/0099460 | A1* | 4/2012 | Murakami | H04W 72/082 370/252 |
| 2012/0135724 | A1* | 5/2012 | Lewis | H04W 92/20 455/422.1 |
| 2012/0246692 | A1* | 9/2012 | Ghosh | H04W 16/14 725/118 |
| 2013/0010774 | A1* | 1/2013 | Subramanian | H04W 74/0808 370/338 |
| 2013/0070605 | A1* | 3/2013 | Ghosh | H04W 72/082 370/241 |
| 2013/0176856 | A1* | 7/2013 | Wang | H04W 74/0808 370/241 |

FOREIGN PATENT DOCUMENTS

| | | |
|---|---|---|
| JP | 2009-055533 A | 3/2009 |
| JP | 2009-077375 A | 4/2009 |

OTHER PUBLICATIONS

Armstrong, "Some Recent Developments of Regenerative Circuits," Proc. Inst. Radio Eng., vol. 10, Aug. 1922, pp. 244-260.

* cited by examiner

TRANSMITTER, TRANSMISSION METHOD USED BY THE SAME, RECEIVER FOR RECEIVING A RADIO SIGNAL FROM TRANSMITTER AND WIRELESS COMMUNICATION SYSTEM INCLUDING THE SAME

TECHNICAL FIELD

The present invention relates to a transmitter, a transmission method used by the same, a receiver for receiving a radio signal from the transmitter and a wireless communication system including the same.

BACKGROUND ART

There are systems where a radio transmits a radio frame while changing the radio frame length (time length) or amplitude to communicate the meaning of the data of the payload of the radio frame and, in addition, a receiver that has received the radio frame detects the changes in frame length or amplitude of the radio frame and treats the detected changes in frame length or amplitude as information such that, when the transmitter transmits a radio signal corresponding to an identifier and the receiver receives the identifier, the transmitter can remote-control the receiver, for example, issue an instruction to transition from sleep mode to active mode upon reception of that identifier.

If such a system uses for its radio scheme a wireless local area network (LAN) compliant with IEEE 802.11 in the Industry Science Medical (ISM) band, the transmitting radio includes a synchronous detection circuit and performs carrier sensing using Carrier Sense Multiple Access with Collision Detection (CSMA/CA) based on the strength of signals that have been band-limited using the frequency span of one particular wireless channel (i.e. the width of 22 MHz) out of separate channels CH1 to CH 14 in the ISM band and, based on the results, transmits radio frames.

In the case of typical wireless LAN communication, a radio that receives radio frames uses a radio interface capable of synchronous detection to demodulate and decode the wireless LAN frames to payload data.

In implementations where changes in frame length or amplitude are detected, signals that have been band-limited by an RF filter are received using envelope detection, which is a type of asynchronous detection, in order to simplify its circuitry and process and to reduce power consumption.

In the case of synchronous detection, signals that have been band-limited by an RF filter are converted to intermediate frequency signals or baseband signals, and a narrower band filter is applied to the frequency after conversion for band-limiting to a desired bandwidth. In the case of asynchronous detection, frequency conversion does not occur; accordingly, signals in a frequency bandwidth adapted to the characteristics of the RF filter are observed.

Most commercial RF filters that can pass the ISM band of 2.4 GHz have relatively broad bands so as to cover the entire ISM band (channels CH1 to Ch14 (i.e. the width of about 100 MHz)). Thus, it is not realistic for reasons of cost and mounting area to add a narrow band filter.

Conventionally, in wireless communication schemes with asynchronous detection, it is known to use the presence and absence of radio frames or changes in the amplitude of radio frames as control identifiers (Patent Document 1).

Also, it is known to control the timing for transmitting radio frames using IEEE 802.11 compatible signals and, depending on the presence or absence of a radio frame, transmit an On OFF Keying (OOK) signal (Patent Document 2).

Patent Document 1: JP 2009-055533 A
Patent Document 2: JP 2009-077375 A
Non-Patent Document 1: E. H. Armstrong, "Some recent developments of regenerative circuits", Proc. Inst. Radio Eng., Vol. 10, pp. 244-260, Aug. 1922.

DISCLOSURE OF THE INVENTION

However, Patent Documents 1 and 2 do not consider interference waves from other channels, which may lead to the problem that a radio apparatus that is intended to transition from sleep mode to active mode does not do so when there is an interference wave from another channel. That is, if there is an interference wave, it is difficult to precisely control a radio apparatus.

The present invention was made to solve this problem. An object of the present invention is to provide a transmitter capable of performing the desired control even if there is an interference wave.

Another object of the present invention is to provide a transmission method capable of performing the desired control even if there is an interference wave.

Still another object of the present invention is to provide a receiver that receives a radio signal from a transmitter capable of performing the desired control even if there is an interference wave.

Yet another object of the present invention is to provide a wireless communication system capable of performing the desired control even if there is an interference wave.

According to an embodiment of the present invention, a transmitter transmits a radio frame in accordance with a wireless communication scheme where the transmitter performs carrier sensing and transmits a radio signal when a wireless communication space is available and waits to transmit the radio signal when the wireless communication space is not available, and includes a carrier sensing unit and a transmitting unit. The carrier sensing unit performs carrier sensing in a desired frequency band including a plurality of frequency channels. The transmitting unit performs, each time executing carrier sensing, a transmission process where the transmitting unit transmits, in the desired frequency band, one radio frame such that a time interval between detection timings of a radio frame in a radio apparatus of a receiver constitutes one or more of one or more signal detection intervals representing an identifier when the wireless communication space is available as a result of the carrier sensing by the carrier sensing unit, and waits to transmit the one radio frame when the carrier sensing indicates that the wireless communication space is not available.

According to another embodiment of the present invention, a transmission method transmits a radio frame in accordance with a wireless communication scheme where a transmitter performs carrier sensing and transmits a radio signal when a wireless communication space is available and waits to transmit the wireless signal when the wireless communication space is not available, and includes a first step performing carrier sensing in a desired frequency band including a plurality of frequency channels, and a second step performing, each time carrier sensing is performed, a transmission process where the transmitter transmits, in the desired frequency band, one radio frame such that a time interval between detection timings of a radio frame in a radio apparatus of a receiver constitutes one or more of one or more signal detection intervals representing an identifier when the wireless communication space is available as a result of the carrier sensing, and waits to transmit the one radio frame when the carrier sensing indicates that the wireless communication space is not available.

According to still another embodiment of the present invention, a receiver includes a filter, a wave detecting unit, a converting unit and a control unit. The filter passes a reception signal of a radio frame that is in a desired bandwidth including a plurality of frequency channels. The wave detecting unit detects the reception signal that has passed through the filter. The converting unit samples a detection result by the wave detecting unit at a sampling period and converts the detection result to a digital signal sequence. The control unit performs desired control when one or more signal detection intervals detected based on the digital signal sequence match an identifier.

According to yet another embodiment of the present invention, a wireless communication system includes the transmitter according to any one of claims 1 to 5 and the receiver according to any one of claims 11 to 13.

The transmitter according to an embodiment of the present invention transmits, in a desired frequency band, one radio frame such that a time interval between detection timings of a radio frame in a radio apparatus of a receiver constitutes one or more of one or more signal detection intervals representing the identifier when the wireless communication space is available, and waits to transmit the radio frame when the wireless communication space is not available. When the wireless communication space is not available, a radio apparatus other than the transmitter transmits a radio frame. As a result, the radio apparatus of the receiver receives a radio frame from the transmitter when the wireless communication space is available, and receives a radio frame from a radio apparatus other than the transmitter when the wireless communication space is not available. Then, the radio apparatus of the receiver performs the desired control if one or more signal detection intervals detected based on a reception signal of a radio frame received from the transmitter and a radio apparatus other than the transmitter match the identifier.

Thus, the desired control can be performed even if there is an interference wave.

The transmission method according to an embodiment of the present invention transmits, in a desired frequency band, one radio frame such that the time interval between detection timings of the radio frame in the radio apparatus of the receiver constitutes the one or more of the one or more signal detection intervals representing the identifier when the wireless communication space is available, and waits to transmit the radio frame when the wireless communication space is not available.

Thus, as described above, the desired control can be performed even if there is an interference wave.

The receiver according to an embodiment of the present invention converts a detection result of a reception signal that has passed through a bandwidth including a plurality of frequency channels to a digital signal sequence, and performs the desired control when one or more signal detection intervals detected based on the converted digital signal sequence matches the identifier. As a result, the one or more signal detection intervals are detected based on at least one of a reception signal from the transmitter and a reception signal from a radio apparatus other than the transmitter and, if the detected one or more signal detection intervals match the identifier, the desired control can be performed.

Thus, the desired control can be performed even if there is an interference wave.

BEST MODES FOR CARRYING OUT THE INVENTION

Figure 1:
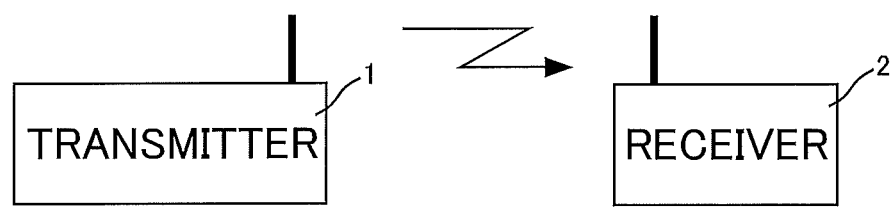
FIG. 1 is a schematic diagram of a wireless communication system according to Embodiment 1 of the present invention.

Embodiments of the present invention will be described in detail with reference to the drawings. The same or corresponding parts in the drawings are labeled with the same numerals and their description will not be repeated.

[Embodiment 1]

FIG. 1 is a schematic diagram of a wireless communication system according to Embodiment 1 of the present invention. Referring to FIG. 1, the wireless communication system 10 according to Embodiment 1 of the present invention includes a transmitter 1 and a receiver 2.

When causing the receiver 2 to transition from sleep mode to active mode, the transmitter 1 complies with a CSMA/CA wireless communication scheme to transmit a radio frame to the receiver 2 in a desired frequency band including a plurality of frequency channels such that the ID (i.e. identifier) of the receiver 2 is detected by the receiver 2. The desired frequency band may be, for example, an ISM band. The CSMA/CA wireless communication scheme means a wireless communication scheme where the transmitter performs carrier sensing, and transmits a radio signal when the wireless communication space is available and waits to transmit a radio signal when the wireless communication space is not available.

The receiver 2 receives a radio frame from the transmitter 1 in the desired frequency band including a plurality of frequency channels and, if the received radio frame matches its ID, transitions from sleep mode to active mode.

Figure 2:
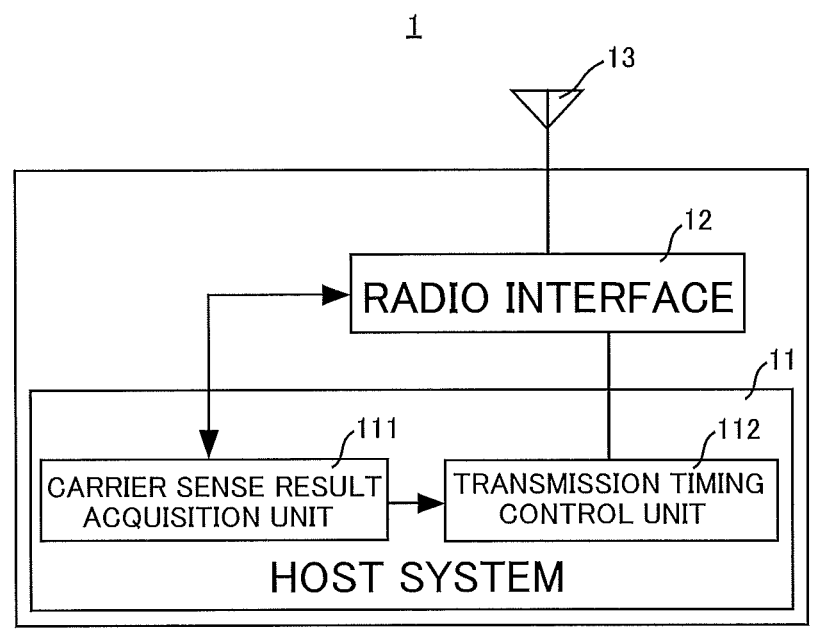
FIG. 2 is a schematic diagram of a configuration of the transmitter shown in FIG. 1.

FIG. 2 is a schematic diagram of a configuration of the transmitter shown in FIG. 1. Referring to FIG. 2, the transmitter 1 includes a host system 11, a radio interface 12 and an antenna 13.

The host system 11 holds the ID of the receiver 2. When causing the receiver 2 to transition from sleep mode to active mode, the host system 11 controls the timing for transmitting radio frames in the radio interface 12 such that the receiver 2 detects signal detection intervals that represent the ID of the receiver 2 that it holds.

In accordance with control by the host system 11, the radio interface 12 performs carrier sensing via the antenna 13, and provides the result of carrier sensing to the host system 11. Further, the radio interface 12 transmits radio frames to the receiver 2 via the antenna 13 at the transmission timing controlled by the host system 11.

The host system 11 includes a carrier sense result acquisition unit 111 and a transmission timing control unit 112.

The carrier sense result acquisition unit 111 controls the radio interface 12 to perform carrier sensing. Further, the carrier sense result acquisition unit 111 receives the result of carrier sensing from the radio interface 12 and forwards the received result of carrier sensing to the transmission timing control unit 112.

The transmission timing control unit 112 receives the result of carrier sensing from the carrier sense result acquisition unit 111 and performs transmission control based on the received result of carrier sensing, controls the timing for transmitting radio frames in the radio interface 12 based on the ID of the receiver 2, and, if it determines that the wireless communication space is available based on the result of carrier sensing at a time when a radio frame is to be transmitted, transmits a radio frame. If the transmission timing control unit 112 determines that the wireless communication space is not available based on the result of carrier sensing at a time when a radio frame is to be transmitted, it does not transmit a radio frame in the radio interface 12.

Figure 3:
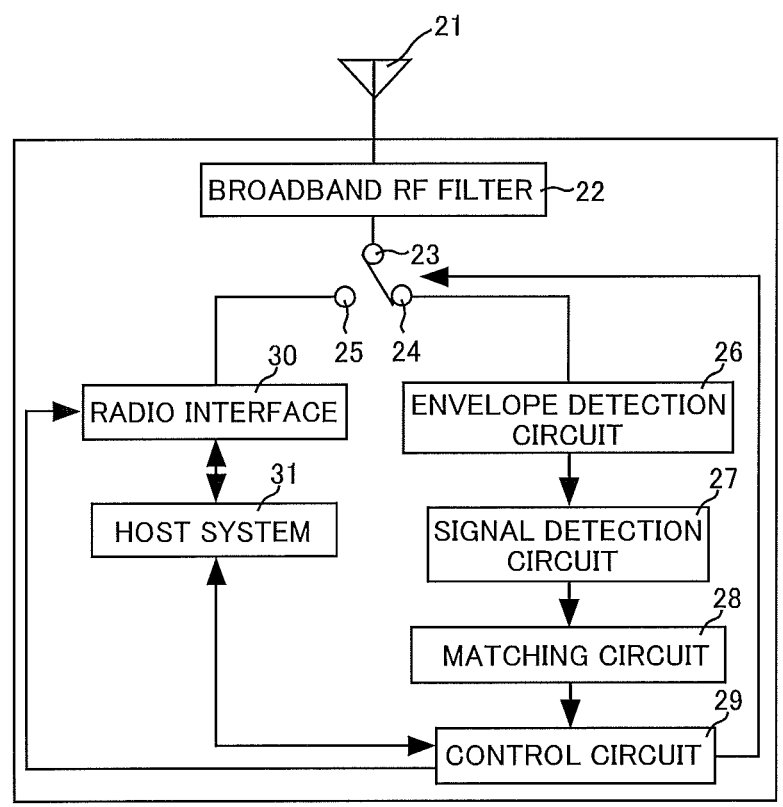
FIG. 3 is a schematic diagram of a configuration of the receiver shown in FIG. 1.

FIG. 3 is a schematic diagram of a configuration of the receiver 2 shown in FIG. 1. Referring to FIG. 3, the receiver 2 includes an antenna 21, a broadband RF filter 22, a switch 23, terminals 24 and 25, an envelope detection circuit 26, a signal detection circuit 27, a matching circuit 28, a control circuit 29, a radio interface 30, and a host system 31.

The broadband RF filter 22 is connected between the antenna 21 and the switch 23. The terminal 24 is connected to the envelope detection circuit 26. The terminal 25 is connected to the radio interface 30.

The broadband RF filter 22 receives a reception signal of a radio frame via the antenna 21 and forwards only those components of the received reception signal that are contained in the desired frequency band.

The switch 23 is connected to the terminal 24 or 25 in accordance with control by the control circuit 29. More specifically, the switch 23 is connected to the terminal 24 when it receives a signal of L (logical low) level from the control circuit 29. The switch 23 is connected to the terminal 25 when it receives a signal of H (logical high) level from the control circuit 29. Then, the switch 23 receives a reception signal form the broadband RF filter 22 and forwards the received reception signal to the envelope detection circuit 26 or the radio interface 30.

The envelope detection circuit 26 receives a reception signal from the switch 23 via the terminal 24, detects an envelope of the received reception signal and provides the detected envelope to the signal detection circuit 27.

The signal detection circuit 27 receives the envelope from the envelope detection circuit 26. Then, the signal detection circuit 27 samples the envelope at a sampling period to convert it to a digital signal sequence, and provides the converted digital signal sequence to the matching circuit 28.

The matching circuit 28 receives the result of sampling from the signal detection circuit 27 and, based on the received result of sampling, determines whether the reception signal received by the receiver 2 matches the ID of the receiver 2. If the reception signal received by the receiver 2 matches the ID of the receiver 2, the matching circuit 28 outputs a signal consisting of "1" to the control circuit 29, or, if the reception signal received by the receiver 2 does not match the ID of the receiver 2, the circuit outputs a signal consisting of "0" to the control circuit 29. The signal consisting of "1" is a signal indicating that the ID of the receiver 2 has been received, and the signal consisting of "0" is a signal indicating that the ID of the receiver 2 has not been received.

When the control circuit 29 receives a signal of H level from the matching circuit 28, it causes the radio interface 30 and host system 31 to transition from sleep mode to active mode. Then, the control circuit 29 outputs a signal of H level to the switch 23.

When the control circuit 29 receives a signal of L level from the matching circuit 28, it keeps the radio interface 30 and host system 31 in sleep mode.

When the control circuit 29 determines that, when the radio interface 30 and host system 31 is in active mode, the host system 31 has not conducted wireless communication for a certain period of time, it causes the radio interface 30 and host system 31 to transition from active mode to sleep mode, and outputs a signal of L level to the switch 23.

The radio interface 30 transitions from sleep mode to active mode or from active mode to sleep mode in accordance with control by the control circuit 29. The radio interface 30 receives a reception signal from the switch 23 via the terminal 25, and demodulates and decodes the received reception signal and forwards it to the host system 31. When the radio interface 30 receives a signal transmitted from the host system 31, it modulates the received transmission signal to transmit it via the terminal 25, switch 23, broadband RF filter 22 and antenna 21.

The host system 31 transitions from sleep mode to active mode or from active mode to sleep mode in accordance with control by the control circuit 29. The host system 31 receives a signal from the radio interface 30. Further, the host system 31 generates a transmission signal and outputs the generated transmission signal to the radio interface 30.

"Sleep mode" of the receiver 2 means that the radio interface 30 and host system 31 are not operating and the broadband RF filter 22, envelope detection circuit 26, signal detection circuit 27, matching circuit 28 and control circuit 29 are operating; "active mode" of the receiver 2 means that the broadband RF filter 22, envelope detection circuit 26, signal detection circuit 27, matching circuit 28, control circuit 29, radio interface 30 and host system 31 are operating.

Alternatively, in the arrangement of the receiver 2 shown in FIG. 3, the switch 23 and terminals 24 and 25 may be omitted and the antenna 21 and broadband RF filter 22 may be replaced by an antenna connected to the envelope detection circuit 26 via the broadband RF filter and an antenna connected to the radio interface 30 via the broadband RF filter.

Figure 4:
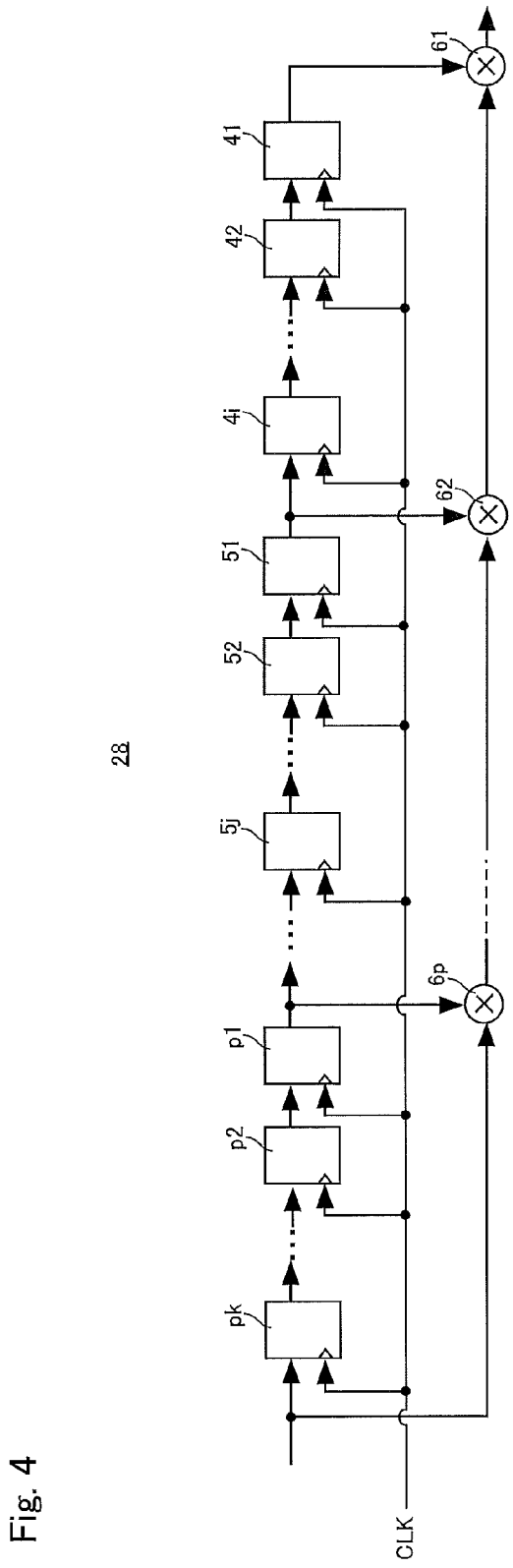
FIG. 4 is a circuit diagram of the matching circuit shown in FIG. 3.

FIG. 4 is a circuit diagram of the matching circuit 28 shown in FIG. 3. Referring to FIG. 4, the matching circuit 28 includes flip-flops 41 to 4$i$ (i is a positive integer), 51 to 5$j$ (j is a positive integer), p1 to pk (p is an integer equal to the number of signal detection intervals that constitute the ID of the receiver 2; k is a positive integer), and an AND circuit 61 to 6$p$.

The flip-flops 41 to 4$i$, 51 to 5$j$, . . . , and p1 to pk are connected in series. Each of the flip-flops 41 to 4$i$, 51 to 5$j$, . . . , and p1 to pk operates in synchronization with the clock CLK. The cycle of the clock CLK is equal to the sampling period T of the receiver 2.

The flip-flops 41 to 4$i$, 51 to 5$j$, . . . , and p1 to pk-1 receive a signal from the flip-flops 42 to 4$i$, 51, 52 to 5$j$, . . . , p1, and p2 to pk, respectively. The flip-flop pk receives a digital signal from the signal detection circuit 27. The flip-flops 42 to 4$i$, 51 to 5$j$, . . . , and p1 to pk each hold a signal for one cycle of the clock CLK and output the signal that they hold to the flip-flops 41 to 4$i$-1, 4$i$, 51 to 5$j$-1, 5$j$, . . . , and p1 to pk-1, respectively. The flip-flop 41 outputs a signal to the AND circuit 61, the flip-flop 51 outputs a signal to the AND circuit 62, and so forth, and the flip-flop circuit p1 outputs a signal to the AND circuit 6$p$.

The AND circuit 61 calculates the logical product of a signal from the flip-flop 41 and a signal from the AND circuit 62, and outputs the calculation result to the control circuit 29; the AND circuit 62 calculates the logical product of a signal from the flip-flop 51 and a signal from the AND circuit 63 (not shown), and outputs the calculation result to the AND circuit 61; and so forth, and; the AND circuit 6$p$ calculates the logical product of a signal from the flip-flop p1 and a signal from the signal detection circuit 27, and outputs the calculation result to the AND circuit 6$p$-1 (not shown).

If the ID of the receiver 2 is represented by signal detection intervals, the flip-flops 41 to 4$i$ detect a time interval corresponding to the first one of a plurality of signal detection intervals constituting the ID; the flip-flops 51 to 5$j$ detect a time interval corresponding to the second one of the plurality of signal detection intervals constituting the ID; and so forth, and; the flip-flops p1 to pk detect a time interval corresponding to the last one of the plurality of signal detection intervals constituting the ID.

Figure 5:
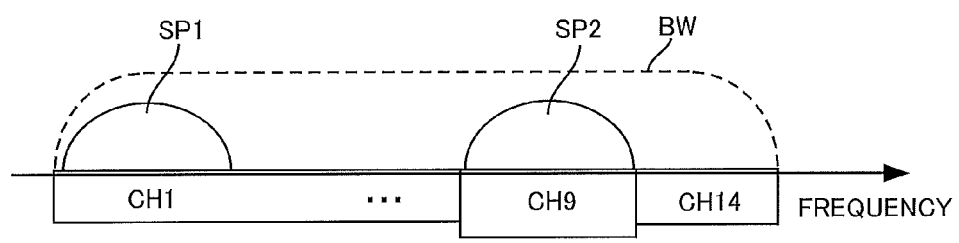
FIG. 5 is a conceptual diagram of frequency bands.

FIG. 5 is a conceptual diagram of frequency bands. Referring to FIG. 5, the frequency band BW is an ISM frequency band. The frequency band BW includes channels CH1 to CH14.

The spectrum SP1 is the spectrum of a desired wave, and the spectrum SP2 is the spectrum of a wave other than the desired wave on another channel.

Thus, the frequency band BW is a frequency band including a plurality of frequency channels.

The transmitter 1 performs carrier sensing in the frequency band of channel CH1 and, if the frequency band of channel CH1 is available, transmits radio frames.

The broadband RF filter 22 shown in FIG. 3 passes those components included in the frequency band BW of the reception signal of a radio signal. As such, the receiver 2 receives, in addition to radio frames transmitted by the transmitter 1, radio frames transmitted on channels other than channel CH1, such as channel 9.

Figure 6:
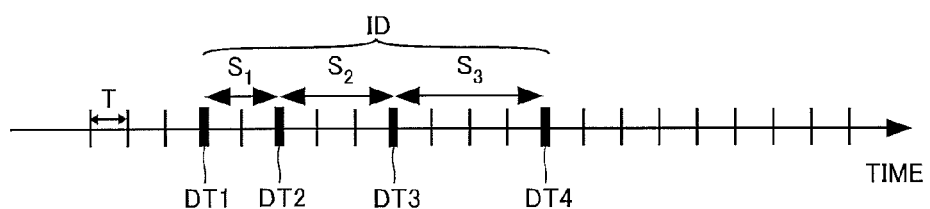
FIG. 6 is a conceptual diagram of signal detection intervals that represent the ID of the receiver.

FIG. 6 is a conceptual diagram of signal detection intervals that represent the ID of the receiver 2. Referring to FIG. 6, the ID of the receiver 2 may be made up of the pattern $[S_1 S_2 S_3]$ of three signal detection intervals $S_1$, $S_2$ and $S_3$, for example. If the sampling period of an envelope at the receiver 2 is denoted by T, the signal detection interval $S_1$ has 2T, the signal detection interval $S_2$ has 3T, and the signal detection interval $S_3$ has 4T. The sampling period T may be 500 µs, for example.

To detect the three signal detection intervals $S_1$, $S_2$ and $S_3$, it is necessary to determine that the reception signal in each of the four detection timings DT1 to DT4 is "1".

If the number of detection timings is denoted by k (k is an integer not less than 2), the ID of the receiver 2 is represented by k-1 signal detection intervals $S_1$ to $S_{k-1}$. For example, if k=n, $0 \leq S_i \leq mT$ (i=1, 2, . . . , n-1; m is a positive integer), the $m^{n-1}$ IDs shown in Table 1 may be represented by the signal detection intervals $S_1$ to $S_{n-1}$.

TABLE 1

| ID | $S_1$ | $S_2$ | ... | $S_{k-1}$ |
|---|---|---|---|---|
| 0 | T | T | ... | T |
| 1 | 2T | T | ... | T |
| 2 | 3T | T | ... | T |
| . | . | . | . | . |
| . | . | . | . | . |
| . | . | . | . | . |
| m − 1 | mT | T | ... | T |
| m | T | 2T | ... | T |
| m + 1 | T | 3T | ... | T |
| . | . | . | . | . |
| . | . | . | . | . |
| . | . | . | . | . |
| $m^{n-1}$ | mT | mT | ... | mT |

Accordingly, in Embodiment 1 of the present invention, the ID of the receiver 2 to be transitioned from sleep mode to active mode is represented by one of the $m^{n-1}$ IDs shown in Table 1.

Figure 7:
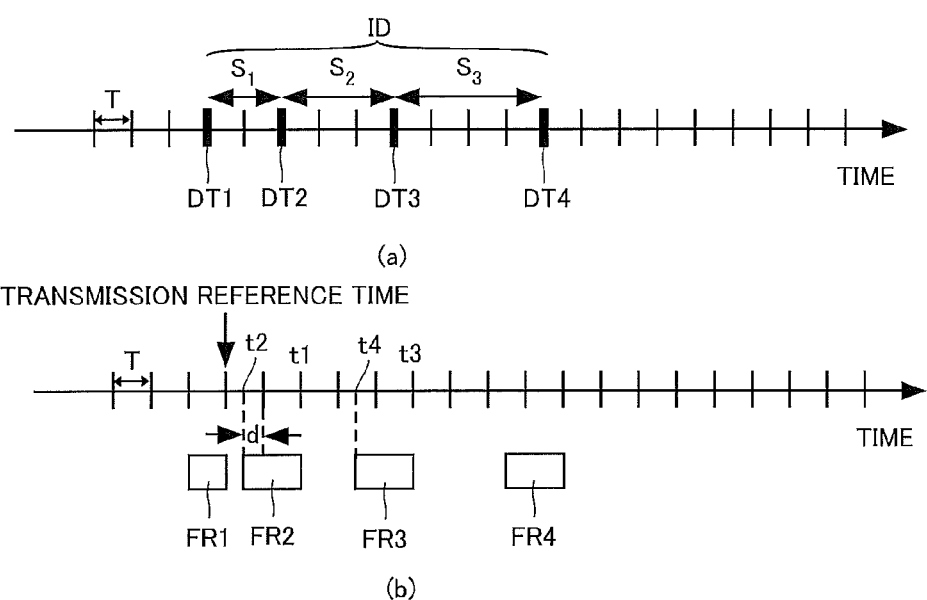
FIG. 7 illustrates a method of transmitting a radio frame in the transmitter shown in FIG. 1.

FIG. 7 illustrates a method of transmitting a radio frame in the transmitter 1 shown in FIG. 1.

FIG. 7($a$) shows the detection timings of the signal detection intervals in the receiver 2, and FIG. 7($b$) shows transmission control reference timings of radio frames in the transmitter 1.

Referring to FIG. 7, the ID of the receiver 2 is made up of the above-described pattern of signal detection intervals, [$S_1S_2S_3$]. The transmitter 1 sequentially transmits four radio frames FR1 to FR4 in such a way that the receiver 2 can determine that the reception signal in each of the detection timings DT1 to DT4 is "1" to detect the signal detection interval $S_1$ with 2T, the signal detection interval $S_2$ with 3T and the signal detection interval $S_3$ with 4T.

A more specific description will be given. The transmitter 1 transmits the radio frame FR1 with a frame length of T. Then, the transmitter 1 defines the time at which transmission of the radio frame FR1 is completed as a transmission reference time for the radio frames FR2 to FR4 (see FIG. 7(b)).

The receiver 2 can detect that the reception signal in the detection timing DT1 is "1" by receiving the radio frame FR1. As a result, a reference to detect the signal detection intervals $S_1$, $S_2$ and $S_3$ are determined.

Then, the transmitter 1 transmits the radio frame FR2 such that the receiver 2 may determine that the reception signal in the detection timing DT2 is "1". That is, the transmitter 1 attempts to transmit the radio frame FR2 prior to the transmission control reference timing by the transmission spare time d and transmits the radio frame FR2 such that the radio frame FR2 straddles the detection timing DT2. The transmission spare time d may be 100 μs, for example.

Subsequently, the transmitter 1 sequentially transmits the radio frames FR3 and FR4 in an analogous manner (see FIG. 7(b)).

Figure 8:
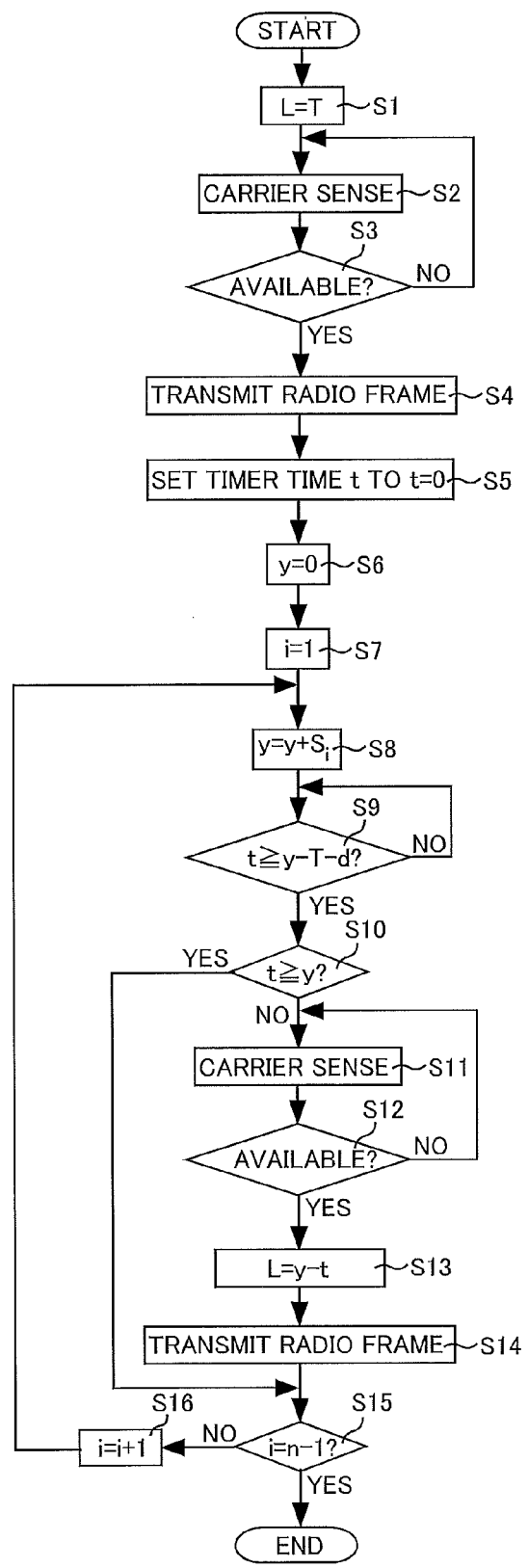
FIG. 8 is a flow chart showing the method of transmitting a radio frame in the transmitter 1.

FIG. 8 is a flow chart showing the method of transmitting a radio frame in the transmitter 1. The flow chart shown in FIG. 8 is executed in lower-order layers (i.e. the MAC layer and physical layer).

Referring to FIG. 8, upon starting transmission of radio frames, the transmission timing control unit 112 of the transmitter 1 sets the length L of a radio frame to L=T (step S1).

Then, the carrier sense result acquisition unit 111 controls the radio interface 12 for carrier sensing, and the radio interface 12 performs carrier sensing in the frequency band of channel CH1, for example (step S2), and outputs the result of carrier sensing to the carrier sense result acquisition unit 111.

Then, the carrier sense result acquisition unit 111 forwards the received result of carrier sensing to the transmission timing control unit 112.

Based on the result of carrier sensing received from the carrier sense result acquisition unit 111, the transmission timing control unit 112 determines whether the frequency band of channel CH1 is available (step S3).

If it is determined at step $S_3$ that the frequency band of channel CH1 is not available, steps $S_2$ and $S_3$ are repeated. That is, the transmitter 1 waits to transmit radio frames.

If it is determined at step $S_3$ that the frequency band of channel CH1 is available, the transmission timing control unit 112 controls the radio interface 12 to transmit a radio frame with a frame length of T, and the radio interface 12 transmits a radio frame via the antenna 13 in accordance with control by the transmission timing control unit 112 (step S4).

Then, the transmission timing control unit 112 sets the time t of its incorporated timer to t=0 (step S5), and sets the frame transmission completion time y to y=0 (step S6).

Then, the transmission timing control unit 112 sets i to i=1 (step S7), and sets y to y=y+$S_i$ (step S8).

Thereafter, the transmission timing control unit 112 determines whether t≥y−T−d is satisfied (step S9). If it is determined at step $S_9$ that t≥y−T−d is satisfied, the transmission timing control unit 112 further determines whether t≥y is satisfied (step S10). If it is determined at step $S_{10}$ that t≥y is satisfied, a series of operation proceeds to step S15.

If it is determined at step $S_{10}$ that t<y is satisfied, the carrier sense result acquisition unit 111 controls the radio interface 12 for carrier sensing, and the radio interface 12 performs carrier sensing in the frequency band of channel CH1, for example (step S11), and outputs the result of carrier sensing to the carrier sense result acquirer 111.

The carrier sense result acquisition unit 111 receives the result of carrier sensing from the radio interface 12, and outputs the received result of carrier sensing to the transmission timing control unit 112.

Based on the result of carrier sensing received from the carrier sense result acquisition unit 111, the transmission timing control unit 112 determines whether the frequency band of channel CH1 is available (step S12).

If it is determined at step $S_{12}$ that the frequency band of channel CH1 is not available, steps $S_{11}$ and $S_{12}$ are repeated. That is, the transmitter 1 waits to transmit radio frames.

If it is determined at step $S_{12}$ that the frequency band of channel CH1 is available, the transmission timing control unit 112 sets the frame length L to L=y−t (step S13), and controls the radio interface 12 to transmit a radio frame with a frame length of L=y−t. Then, the radio interface 12 transmits radio frames in accordance with control by the transmission timing control unit 112 (step S14).

If it is determined at step $S_{10}$ that t≥y is satisfied, or after step S14, the transmission timing control unit 112 determines whether i=n−1 is satisfied (step S15).

If it is determined at step $S_{15}$ that i=n−1 is not true, the transmission timing control unit 112 sets i to i=i+1 (step S16). Thereafter, a series of operation returns to step $S_8$ and above-described the steps $S_8$ to $S_{16}$ are repeated until it is determined at the step $S_{15}$ that i=n−1 is satisfied. If it is determined at the step $S_{15}$ that i=n−1 is satisfied, the operation of transmitting radio frames in the transmitter 1 ends.

Above-described the steps S1 to $S_4$ transmit the radio frame FR1 shown in FIG. 7(b). Then, the time at which transmission of the radio frame FR1 is completed is set to the reference (=0) for the timer time t (see the step S5). Thereafter, the frame transmission completion time y is set to "0" (step S6).

If the steps $S_8$ to $S_{14}$ are performed for the first time, the radio frame FR2 is transmitted. A more specific description will be given. Since $S_1$=2T, y=y+$S_1$ of step $S_8$ sets the frame transmission completion time y to the transmission control reference timing t1, which is 2T after the transmission completion time for the radio frame FR1 (see FIG. 7(b)).

Further, y−T−d gives the timing t2 (see FIG. 7(b)). Consequently, determining at step $S_9$ whether t≥y−T−d is satisfied is equivalent to determining whether the timer time t has reached the timing t2. Determining that t≥y−T−d is satisfied is equivalent to determining that the timing has reached the timing at which the radio frame FR2 is to be transmitted.

Further, it is determined at step $S_{10}$ whether t≥y is satisfied in order to determine whether the timer time t has reached the frame transmission completion time y (=transmission control reference timing t1). If the timer time t has not reached the frame transmission completion time y (=transmission control reference timing t1), carrier sensing is performed and, if the frequency band of channel CH1 is available, the radio frame FR2 with a frame length of L=y−t (=t1−t2) is transmitted (see "NO" at step S10, and steps S11 to S14).

As steps S8 to S14 are performed for the second time, the radio frame FR3 is transmitted. Since $S_2$=3T is satisfied, y=y+$S_2$ of step $S_8$ sets the frame transmission completion time y to the transmission control reference timing t3, which is 3T after the transmission completion time (=t1) for the radio frame FR2 (see FIG. 7(b)).

Further, y−T−d gives the timing t4 (see FIG. 7(b)). Consequently, if the timer time t has reached the timing t4 and has not passed the transmission control reference timing t3, the radio frame FR3 is transmitted (see "YES" at the step S9, "NO" at the step S10, and the steps S11 to S14).

Thereafter, the radio frame FR4 is transmitted in an analogous manner.

If the radio frames FR1 to FR4 are transmitted in accordance with the flow chart shown in FIG. 8, the radio frame FR1 has a length of T, and each of the radio frames FR2 to FR4 has a length of y−t.

Figure 9:
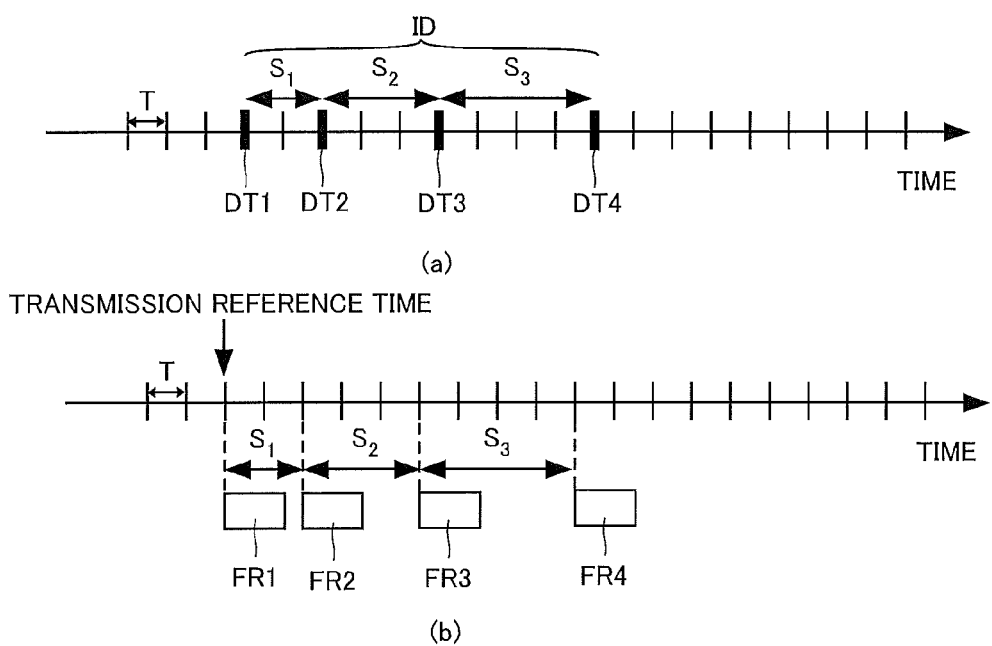
FIG. 9 illustrates another method of transmitting a radio frame in the transmitter shown in FIG. 1.

FIG. 9 illustrates another method of transmitting a radio frame in the transmitter 1 shown in FIG. 1.

FIG. 9(a) shows detection timing of the signal detection intervals in the receiver 2, and FIG. 9(b) shows the transmission control reference timing of radio frames in the transmitter 1.

Referring to FIG. 9, the ID of the receiver 2 is made up of the above-described pattern of the signal detection intervals, [$S_1S_2S_3$]. The transmitter 1 sequentially transmits four radio frames FR1 to FR4 in such a way that the receiver 2 detects that the reception signal for each of the detection timings DT1 to DT4 is "1" to detect the signal detection interval $S_1$ with 2T, the signal detection interval $S_2$ with 3T and the signal detection interval $S_3$ with 4T.

A more specific description will be given. The transmitter 1 transmits the radio frame FR1 in synchronization with an arbitrary transmission control reference timing (=transmission reference time). Then, if the time corresponding to the signal detection interval $S_1$ with 2T after the transmission reference time passes, the transmitter 1 transmits the radio frame FR2. Further, if the time corresponding to the signal detection interval $S_2$ with 3T after the transmission starting time for the radio frame FR2 passes, the transmitter 1 transmits the radio frame FR3. Further, if the time corresponding to the signal detection interval $S_3$ with 4T after the transmission starting time for the radio frame FR3, the transmitter 1 transmits the radio frame FR4 (see FIG. 9(b)).

The receiver 2 can determine that the reception signal for each of the detection timings DT1 to DT4 is "1" by receiving the radio frames RF1 to RF4. As a result, the signal detection intervals $S_1$, $S_2$ and $S_3$ are detected.

Each of the radio frames FR1 to FR4 has a length of T+M or greater. Here, M is the maximum difference between the timings for the transmitter 1 and receiver 2 encountered when a radio frame is transmitted using a CSMA/CA wireless communication scheme, and M=50(DIFS)+15×20 (backoff)=350 μs is satisfied.

Consequently, by setting the frame length of each of the radio frames FR1 to FR4 to T+M or greater, the radio frames FR1 to FR4 are transmitted so as to straddle the detection timings DT1 to DT4 in the receiver 2, respectively, thereby allowing the receiver 2 to stably detect the three signal detection intervals $S_1$, $S_2$ and $S_3$.

Figure 10:
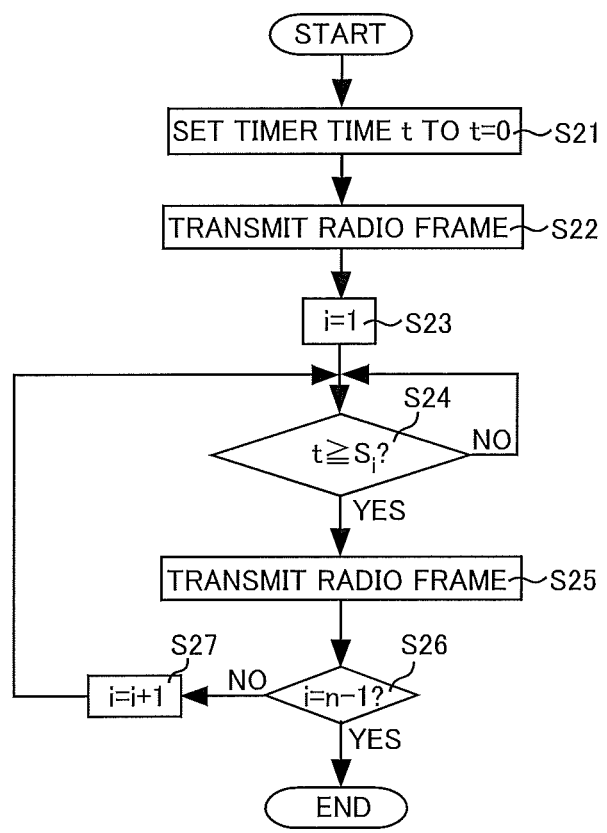
FIG. 10 is a flow chart showing the other method of transmitting a radio frame in the transmitter.

FIG. 10 is a flow chart showing the other method of transmitting a radio frame in the transmitter 1. The flow chart shown in FIG. 10 is executed in an upper-order layer (i.e. the application layer).

Referring to FIG. 10, upon starting transmission of radio frames, the transmission timing control unit 112 sets the timer time t to t=0 (step S21), and transmits the first radio frame FR1 (step S22).

Then, the transmission timing control unit 112 sets i to i=1 (step S23), and determines whether the timer time t is not less than the signal detection interval $S_i$ (step S24).

If it is determined at step $S_{24}$ that the timer time t is not less than the signal detection interval $S_i$, the radio frame FR2 is transmitted (step S25).

Thereafter, the transmission timing control unit 112 determines whether i=n−1 is true (step S26). If it is determined at step S26 that i=n−1 is not true, the transmission timing control unit 112 sets i to i=i+1 (step S27). Thereafter, a series of operation returns to step S24, and above-described steps S24 to S27 are repeated until it is determined at step S26 that i=n−1 is true. Then, if it is determined at step S26 that i=n−1 is true, the operation of transmitting radio frames in the transmitter 1 ends.

Above-described the step S22 transmits the radio frame FR1 shown in FIG. 9(b). Then, when steps S24 and S25 are performed for the first time, if the time corresponding to the signal detection interval $S_1$ after the transmission starting time for the radio frame FR1 passes, the radio frame FR2 is transmitted (see FIG. 9(b)).

When the steps S24 and S25 are performed for the second time, if the time corresponding to the signal detection interval $S_2$ after the transmission starting time for the radio frame FR2 passes, the radio frame FR3 is transmitted (see FIG. 9(b)).

Further, when steps S24 and S25 are performed for the third time, if the time corresponding to the signal detection interval $S_3$ after the transmission starting time for the radio frame FR3 passes, the radio frame FR4 is transmitted (see FIG. 9(b)).

Since the flow chart shown in FIG. 10 is executed in the upper-order layer (i.e. the application layer), as described above, the steps of performing carrier sensing and determining whether the wireless communication space is available based on the result of carrier sensing are not shown in FIG. 10; but, after the upper-order layer (i.e. the application layer) of the transmitter 1 transmits radio frames at step S25, the lower-order layers (i.e. the MAC layer and physical layer) of the transmitter 1 perform carrier sensing, and transmit radio frames when the wireless communication space is available and wait to transmit radio frames when the wireless communication space is not available.

Thus, in implementations where the transmitter 1 transmits radio frames in accordance with the flow chart shown in FIG. 10, too, the transmitter transmits radio frames when the wireless communication space is available and waits to transmit radio frames when the wireless communication space is not available.

Figure 11:
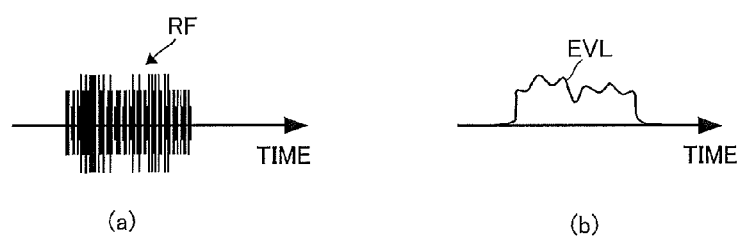
FIG. 11 conceptually shows a wireless signal and envelope.

FIG. 11 conceptually shows a wireless signal and envelope. The broadband RF filter 22 of the receiver 2 receives a reception signal of radio frames via the antenna 21 and outputs those components of the received reception signal that are in the above-described frequency band BW (see FIG. 11(a)), i.e. the reception signal RF, to the envelope detection circuit 26 via the switch 23 and terminal 24.

Then, the envelope detection circuit 26 detects an envelope of the reception signal RF and outputs the envelope EVL (see FIG. 11(b)) to the signal detection circuit 27.

The signal detection circuit 27 samples the envelope EVL at the sampling period T to convert the envelope EVL to a digital signal. Then, the signal detection circuit 27 outputs the digital signal to the matching circuit 28.

Figure 12:
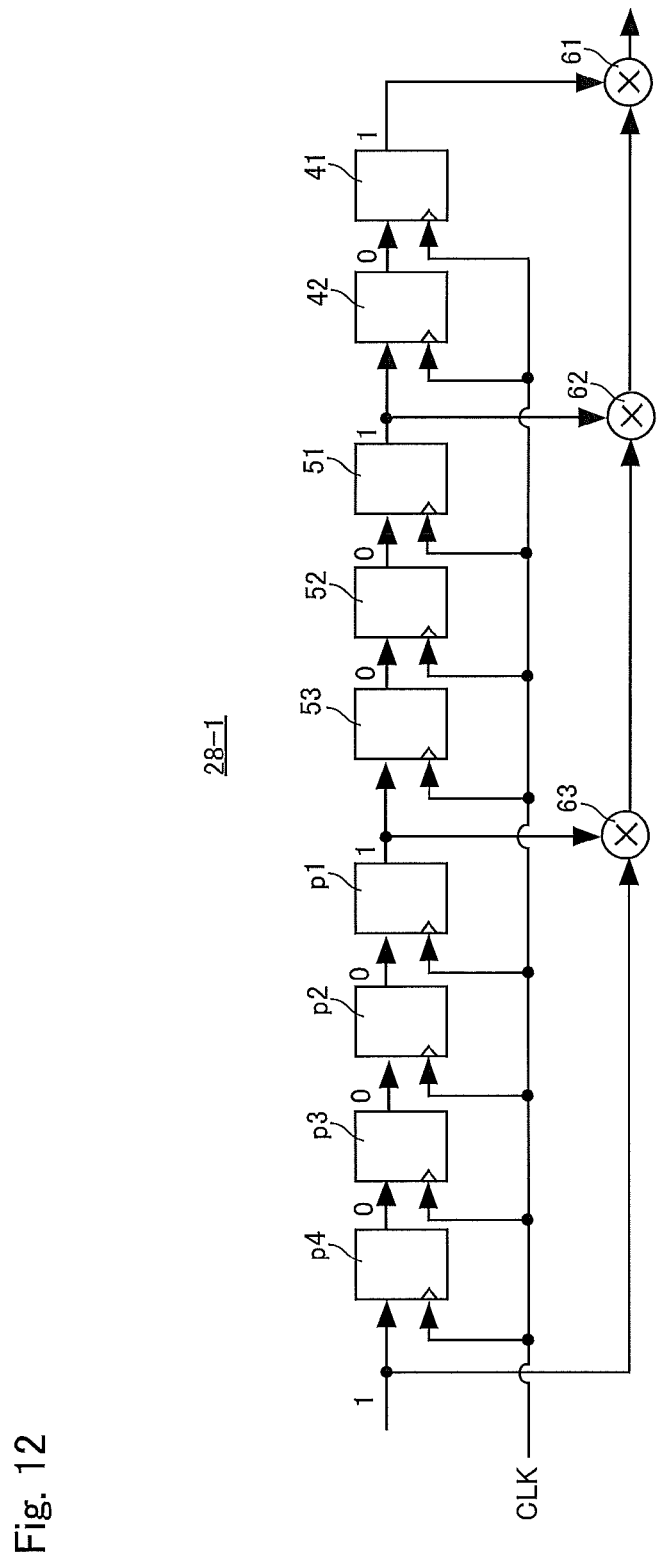
FIG. 12 is a circuit diagram of a specific example of the matching circuit.

FIG. 12 is a circuit diagram of a specific example of the matching circuit 28. If the ID of the receiver 2 is made up of the pattern of signal detection intervals, [$S_1S_2S_3$], the matching circuit 28 is constituted by the matching circuit 28-1 shown in FIG. 12.

Referring to FIG. 12, the matching circuit 28-1 includes flip-flops 41, 42, 51 to 53, p1 to p4 and AND circuits 61 to 63.

The flip-flops 41, 42, 51 to 53, and p1 to p4 are connected in series. The flip-flops 41, 42, 51 to 53, and p1 to p3 receive a signal from the flip-flops 42, 51 to 53, and p1 to p4, respectively, and output the received signal to the AND circuit 61, flip-flops 41, 42, 51 to 53, p1 and p2, respectively. Further, the flip-flop 51 outputs the signal to the AND circuit 62 and the flip-flop p1 outputs the signal to the AND circuit 63. Further, the flip-flop p4 receives a signal from the signal detection circuit 27 and outputs the received signal to the flip-flop p3.

The AND circuit 61 calculates the logical product of the signal from the flip-flop 41 and the signal from the AND circuit 62, and outputs the calculation result to the control circuit 29. The AND circuit 62 calculates the logical product of the signal from the flip-flop 51 and the signal from the AND circuit 63, and outputs the calculation result to the AND circuit 61. The AND circuit 63 calculates the logical product of the signal from the flip-flop p1 and the signal from the signal detection circuit 27, and outputs the calculated logical product to the AND circuit 62.

If the ID of the receiver 2 is made up of the pattern of signal detection intervals, [$S_1S_2S_3$], the signal detection circuit 27 samples the envelope EVL at the detection timing DT1 and outputs a signal consisting of "1" to the matching circuit 28-1 (see FIG. 7(*a*)).

Thereafter, the signal detection circuit 27 samples the envelope EVL at the sampling period T and outputs a signal for "0" to the matching circuit 28-1 (see FIG. 7(*a*)).

Subsequently, the signal detection circuit 27 outputs a signal consisting of "1" at the detection timing DT2 to the matching circuit 28-1, and outputs a signal consisting of "0" to the matching circuit 28-1 at the two sampling timings between the detection timings DT2 and DT3 (see FIG. 7(*a*)).

Further, the signal detection circuit 27 outputs a signal consisting of "1" to the matching circuit 28-1 at the detection timing DT3, outputs a signal consisting of "0" to the matching circuit 28-1 at the three sampling timings between the detection timings DT3 and DT4, and outputs a signal consisting of "1" to the matching circuit 28-1 at the detection timing DT4 (see FIG. 7(*a*)).

As a result, the matching circuit 28-1 receives the digital signal sequence [1010010001] from the signal detection circuit 27.

Then, when a signal consisting of "1" detected at the detection timing DT4 is output to the matching circuit 28-1, the flip-flops 41, 42, 51 to 53, p1 to p4 output signals consisting of "1", "0", "1", "0", "0", "1", "0", "0" and "0", respectively.

Then, the AND circuit 63 calculates the logical product of the signal from the flip-flop p1 (=1) and the signal from the signal detection circuit 27 (=1), and outputs the calculation result (=1) to the AND circuit 62.

The AND circuit 62 calculates the logical product of the signal from the flip-flop 51 (=1) and the signal from the AND circuit 63 (=1) and outputs the calculation result (=1) to the AND circuit 61.

The AND circuit 61 calculates the logical product of the signal from the flip-flop 41 (=1) and the signal from the AND circuit 62 (=1) and outputs the calculation result (=1) to the control circuit 29.

Thus, the matching circuit 28-1 detects the signal detection interval $S_1$ with 2T by the flip-flops 41 and 42, detects the signal detection interval $S_2$ with 3T by the flip-flops 51 to 53, and detects the signal detection interval $S_3$ with 4T by the flip-flops p1 to p4, thereby detecting that a reception signal received from the transmitter 1 matches the ID= [$S_1S_2S_3$].

Thus, if a signal output from the matching circuit 28 to the control circuit 29 consists of "1", it indicates that the reception signal received from the transmitter 1 matches the ID=[$S_1S_2S_3$]; if a signal output from the matching circuit 28 to the control circuit 29 consists of "0", it indicates that the reception signal received from the transmitter 1 does not match the ID=[$S_1S_2S_3$].

The signal consisting of "1" output from the flip-flop 41 indicates that the signal detected at the detection timing DT1 is "1"; the signal consisting of "1" output from the flip-flop 51 indicates that the signal detected at the detection timing DT2 is "1"; the signal consisting of "1" output from the flip-flop p1 indicates that the signal detected at the detection timing DT3 is "1"; and the signal consisting of "1" output from the flip-flop p4 and AND circuit 63 indicates that the signal detected at the detection timing DT4 is "1".

Thus, every one of the flip-flops 41, 51 and p1 outputs the signal consisting of "1" and the signal consisting of "1" is input to the control circuit 29 when every one of the flip-flops 41, 51 and p1 has output the signal consisting of "1", it is equivalent to determining that the signal consisting of "1" was detected at every one of the plurality of detection timings DT1 to DT4 for detecting the plurality of signal detection intervals $S_1$, $S_2$ and $S_3$ that represent the identifier of the receiver 2 based on the digital signal sequence [1010010001].

The flip-flops 41 and 42 detect the signal detection interval $S_1$ with 2T, the flip-flops 51 to 53 detect the signal detection interval $S_2$ with 3T and the flip-flops p1 to p4 detect the signal detection interval $S_3$ with 4T; thus, every one of the flip-flops 41, 51 and p1 outputs the signal consisting of "1" and the signal consisting of "1" is input to the control circuit 29 when every one of the flip-flops 41, 51 and p1 output the signal consisting of "1", it is equivalent to that the plurality of signal detection intervals $S_1$, $S_2$ and $S_3$ determined based on the digital signal sequence [1010010001] received from the signal detection circuit 27 matches the identifier of the receiver 2.

Figure 13:
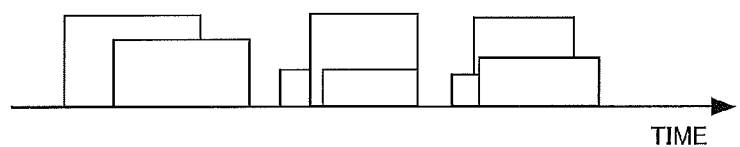
FIG. 13 is a conceptual diagram of reception signals in the case of asynchronous detection.

FIG. 13 is a conceptual diagram of reception signals in the case of asynchronous detection. Referring to FIG. 13, in the asynchronous detection, a plurality of reception signals of a plurality of radio frames transmitted on a plurality of channels are detected as overlapping ones.

As such, the receiver 2 receives radio frames transmitted from the transmitter 1 and radio frames transmitted from a radio apparatus other than the transmitter 1.

Accordingly, in Embodiment 1 of the present invention, the signals consisting of "1" detected at the detection timings DT1 to DT4 shown in FIG. 7 may not be based on the radio frames transmitted from the transmitter 1, and may be based on radio frames transmitted from any radio apparatus other than the transmitter 1.

That is, in Embodiment 1 of the present invention, the signal detection circuit 27 detects the signal consisting of "1" if a reception signal of a radio frame is present at one of the detection timings DT1 to DT4 and detects the signal consisting of "0" if no reception signal of a radio frame is present at one of the detection timings DT1 to DT4, and only the reception of the signal consisting of "1" is meaningful.

Figure 14:
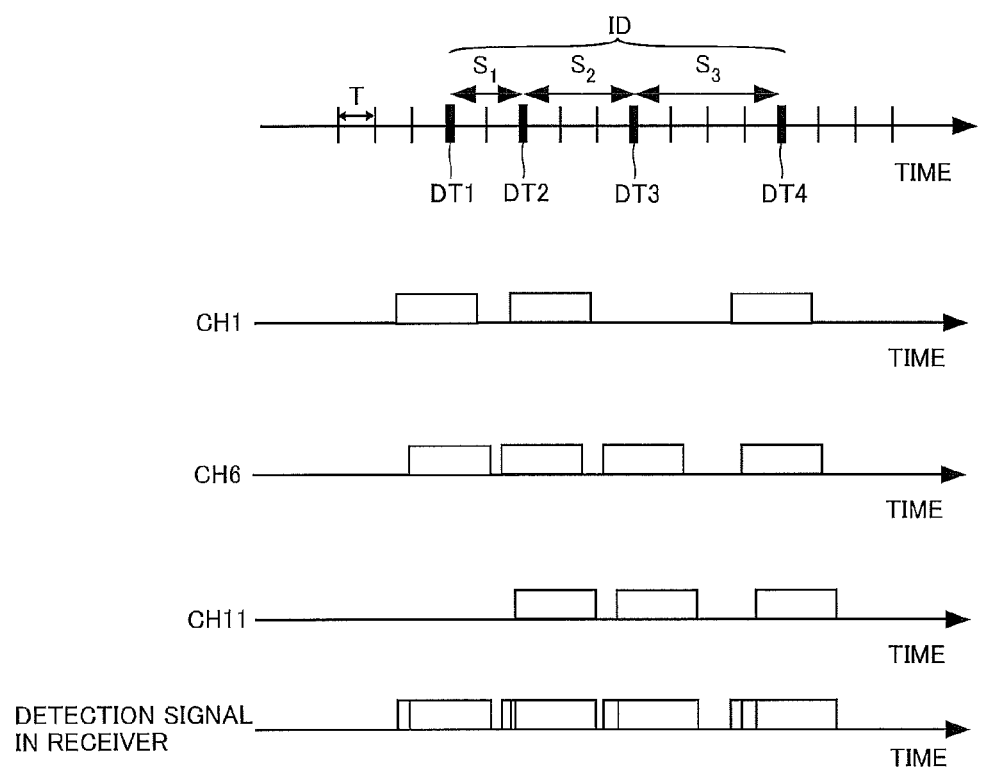
FIG. 14 conceptually shows reception of radio signals via a plurality of channels.

FIG. 14 conceptually shows reception of radio frames via a plurality of channels. Referring to FIG. 14, the transmitter 1 transmits a radio frame on channel CH1, for example, and the receiver 2 receives a plurality of radio frames transmitted on channels CH1, CH6 and CH11, for example.

Signals straddling the detection timing DT1 in the receiver 2 are made of overlapping ones of a radio frame transmitted on channel CH1 and a radio frame transmitted on channel CH6.

Signals straddling the detection timing DT2 in the receiver 2 are made of overlapping ones of a radio frame transmitted on channel CH1, a radio frame transmitted on channel CH6 and a radio frame transmitted on channel CH11.

Signals straddling the detection timing DT3 in the receiver 2 are made of overlapping ones of a radio frame transmitted on channel CH6 and a radio frame transmitted on channel CH11.

Signals straddling the detection timing DT4 in the receiver 2 are made of overlapping ones of a radio frame transmitted on channel CH1, a radio frame transmitted on channel CH6 and a radio frame transmitted on channel CH11.

As a result, even though no radio frame transmitted from the transmitter 1 is present at the detection timing DT3, the receiver 2 detects the signal consisting of "1" at every one of the detection timings DT1 to DT4 and determines that the reception signal of the radio frames that has been received matches the ID=$[S_1S_2S_3]$ of the receiver 2.

Thus, in Embodiment 1 of the present invention, the receiver 2 detects the signal consisting of "1" at every one of the detection timings DT1 to DT4 based on both radio frames transmitted from the transmitter 1 and radio frames transmitted by a radio apparatus other than the transmitter 1. As such, even if the transmitter 1 fails to transmit radio frames that would straddle the respective detection timings DT1 to DT4, the receiver 2 determines that the reception signal of radio frames that have been received matches the ID=$[S_1S_2S_3]$ of the receiver 2, if a radio apparatus other than the transmitter 1 transmits radio frames that will straddle the respective detection timings DT1 to DT4.

This can prevent the receiver 2 from failing to transition to active mode. That is, the desired control can be performed even if there is an interference wave.

Particularly, if there is a hidden terminal for the transmitter 1, a radio frame transmitted by this hidden terminal may be used as a radio frame that allows detection of the ID of the receiver 2.

Figure 15:
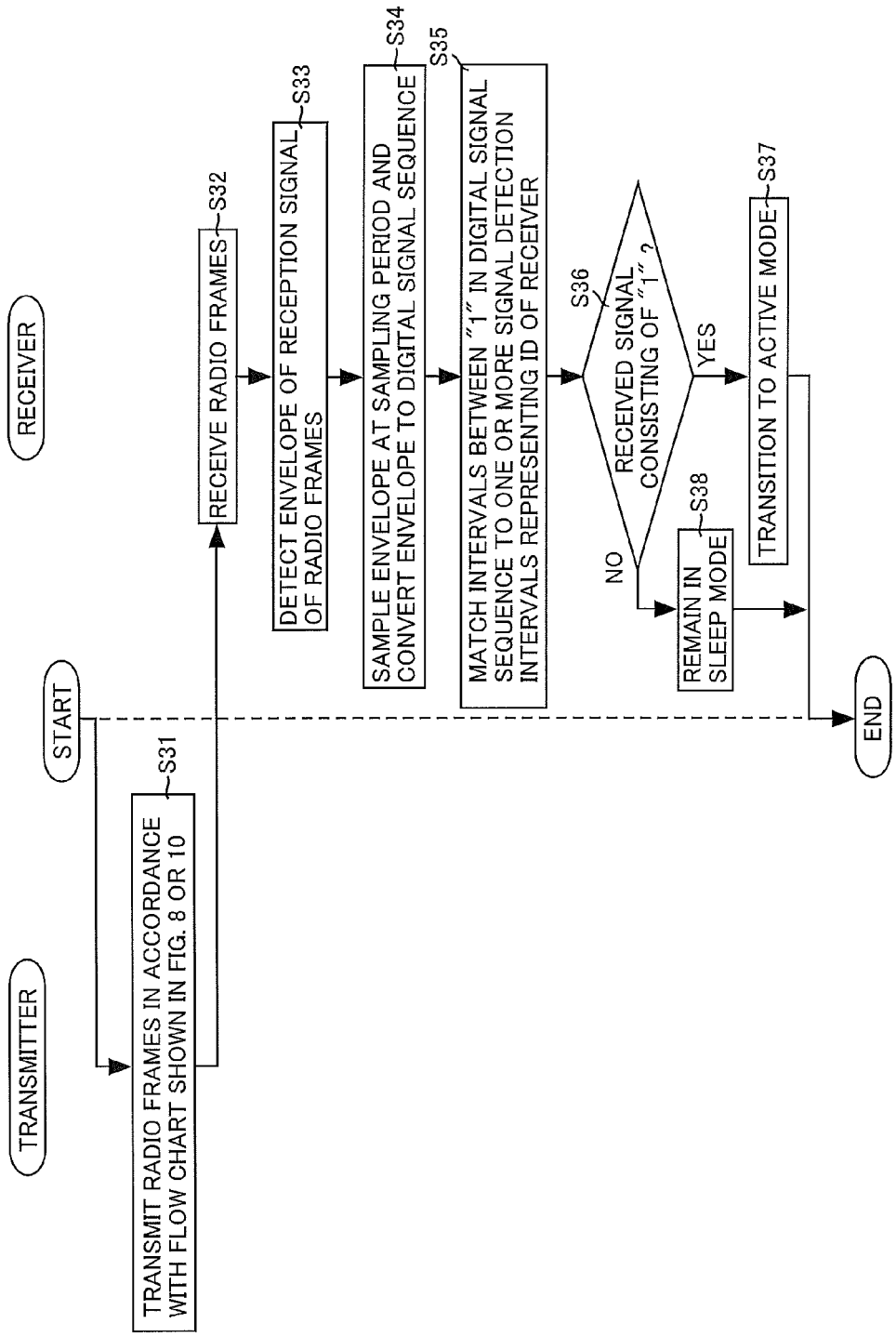
FIG. 15 is a flow chart showing the operation of the wireless communication system for causing the receiver to transition from sleep mode to active mode.

FIG. 15 is a flow chart showing the operation of the wireless communication system 10 for causing the receiver 2 to transition from sleep mode to active mode.

FIG. 15 illustrates the process for causing the receiver 2 to transition from sleep mode to active mode when it is presupposed that the receiver 2 is in sleep mode and the switch 23 is connected to the terminal 24.

Referring to FIG. 15, upon starting the operation for causing the receiver 2 to transition from sleep mode to active mode, the transmitter 1 transmits a plurality of radio frames in accordance with the flow chart of FIG. 8 or 10 (step S31).

Then, the broadband RF filter 22 of the receiver 2 receives a radio frame via the antenna 21 (step S32), and passes those components having the frequency band BW in the reception signal of the received radio frame, and outputs the reception signal having the frequency band BW to the envelope detection circuit 26 via the switch 23 and the terminal 24.

Thereafter, the envelope detection circuit 26 detects an envelope of the reception signal of the radio frame (step S33), and outputs the detected envelope to the signal detection circuit 27.

The signal detection circuit 27 samples the envelope at the sampling period to convert the envelope to a digital signal sequence (step S34), and outputs the converted digital signal sequence to the matching circuit 28.

The matching circuit 28 matches the intervals between "1" in the digital signal sequence to the one or more signal detection intervals that represent the ID of the receiver 2 (step S35).

Then, the control circuit 29 determines whether it has received the signal consisting of "1" from the matching circuit 28 (step S36).

If, at step S36, the control circuit 29 determines that it has received the signal consisting of "1" from the matching circuit 28, it controls the radio interface 30 and host system 31 to transition from sleep mode to active mode; the radio interface 30 and host system 31 transition from sleep mode to active mode (step S37).

If, at step S36, the control circuit 29 determines that it has not received the signal consisting of "1" from the matching circuit 28, it controls the radio interface 30 and host system 31 such that they remain in sleep mode; the radio interface 30 and host system 31 remain in sleep mode (step S38).

Then, after step S37 or S38, a series of operation ends.

At step S1, the transmitter 1 transmits a plurality of radio frames in accordance with the flow chart shown in FIG. 8 or 10 such that the receiver 2 determines that the reception signal received from the transmitter 1 matches the pattern of the plurality of signal detection intervals $[S_1S_2S_3]$ that represent the ID of the receiver 2 (see step S35). In this case, the receiver 2 detects that the reception signal in each one of the detection timings DT1 to DT4 is "1" and the time interval between two adjacent detection timings (DT1 and DT2, for example) is equal to one of the signal detection intervals $S_1$, $S_2$ and $S_3$. If the wireless communication space is available as a result of the carrier sensing, the transmitter 1 transmits one radio frame (see FIG. 8, step S11, "YES" at step S12, steps $S_{13}$ and $S_{14}$, and FIG. 10, step S25). The transmitter 1 waits to transmit radio frames until it is determined based on the result of carrier sensing that the wireless communication space is available (see FIG. 8, step S11 and "NO" at step S12). As described above, if the transmitter 1 transmits radio frames in accordance with the flow chart shown in FIG. 10, it transmits radio frames when the wireless communication space is available and waits to transmit radio frames when the wireless communication space is not available.

Thus, at step S1 the transmitter 1 transmits a plurality of radio frames in accordance with the flow chart shown in FIG. 8 or 10, it is equivalent to the transmitter 1 performing, each time carrier sensing is performed, a transmission process in which the transmitter transmits, when the wireless communication space is available, one radio frame in a desired frequency band such that the time intervals between the detection timings of radio frames at the radio apparatus (i.e. receiver 2) that is intended to transition from sleep mode to active mode constitute one or more of the one or more signal detection intervals that represent the identifier for identifying the radio unit (i.e. receiver 2), and waits to transmit one radio frame when carrier sensing indicates that the wireless communication space is not available.

In this case, one radio frame may constitute a plurality of signal detection intervals. For example, as one radio frame having a frame length that corresponds to the time length from the detection timing DT1 to the detection timing DT3 shown in FIG. 9(a) is transmitted, the receiver 2 detects "1" at the detection timings DT1, DT2 and DT3 based on the reception signal of this one radio frame, thereby detecting a plurality of signal detection intervals $S_1$ and $S_2$.

This makes it advantageous that the transmitter 1 transmits, when the wireless communication space is available, one radio frame in a desired frequency band such that the time intervals between the detection timings for radio frames in the radio apparatus (i.e. the receiver 2) that is intended to transition from sleep mode to active mode constitute one or more of the one or more signal detection intervals that represent the identifier for identifying the radio apparatus (i.e. receiver 2).

Figure 16:
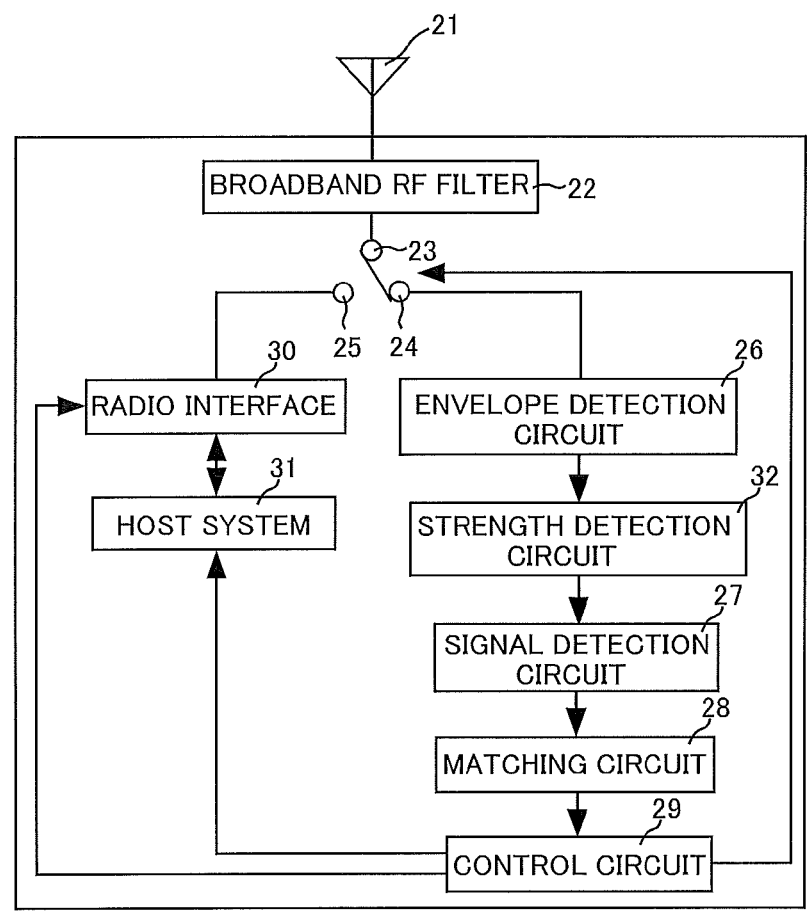
FIG. 16 is a schematic diagram of another configuration of the receiver shown in FIG. 1.

FIG. 16 is a schematic diagram of another configuration of the receiver 2 shown in FIG. 1. The wireless communication system 10 according to Embodiment 1 of the present invention may include a receiver 2A shown in FIG. 16 in place of the receiver 2.

Referring to FIG. 16, the receiver 2A is the same as the receiver 2 except that a strength detection circuit 32 is added to the receiver 2 shown in FIG. 3.

The strength detection circuit 32 is located between the envelope detection circuit 26 and the signal detection circuit 27. The strength detection circuit 32 receives a detected envelope from the envelope detection circuit 26, and detects the strength of the received detected envelope, i.e. a reception signal strength. Then, the strength detection circuit 32 compares the detected reception signal strength with a threshold TI and, if the reception signal strength is larger than the threshold TI, provides a detected signal having the detected reception signal strength to the signal detection circuit 27. If the detected reception signal strength is not more than the threshold TI, the strength detection circuit 32 discards a detected signal having the detected reception signal strength.

Thus, the strength detection circuit 32 outputs to the signal detection circuit 27 only those of the detected signals received from the envelope detection circuit 26 that have a reception signal strength larger than the threshold TI. Then, the signal detection circuit 27 samples the detected signals from the strength detection circuit 32 at the sampling period and converts the detected signals to a digital signal sequence.

"Sleep mode" of the receiver 2A means that the radio interface 30 and the host system 31 are not operating and the broadband RF filter 22, the envelope detection circuit 26, the strength detection circuit 32, the signal detection circuit 27, the matching circuit 28 and the control circuit 29 are operating; "active mode" means that the broadband RF filter 22, the envelope detection circuit 26, the strength detection circuit 32, the signal detection circuit 27, the matching circuit 28, the control circuit 29, the radio interface 30 and the host system 31 are operating.

Figure 17:
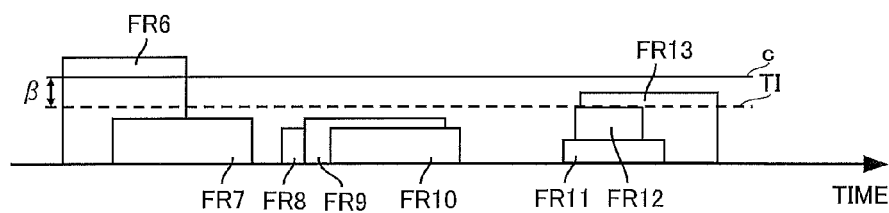
FIG. 17 illustrates how a threshold can be determined.

FIG. 17 illustrates how the threshold TI is determined. The minimum value (=c) of the reception signal strength of a radio frame encountered when the radio frame from the transmitter 1 that controls the operation of the receiver 2A is received properly by the receiver 2A is measured in advance.

Then, the threshold TI is defined as TI=c−β (β>0). Here, β is a margin and may be 6 dB, for example. That is, the threshold TI is the reception signal strength lower than the minimum value (=c) of the reception signal strength by β.

Thus, the radio frames FR7 to FR12 are excluded and the radio frames FR6 and FR13 are used for matching of a reception signal to the ID of the receiver 2A.

Typically, a radio apparatus EX that transmits a signal on a channel different from the channel used by the transmitter 1 (=CH1) is located more distant from the receiver 2A than the transmitter 1 is. As such, the reception signal strength of a radio frame transmitted from the radio unit EX is smaller than the reception signal strength of a radio frame transmitted from the transmitter 1.

Thus, as the threshold TI is introduced, the receiver 2A is capable of determining whether a reception signal matches its ID while excluding interference frames transmitted from the radio unit EX (i.e. the radio frames FR7 to FR12).

Figure 18:
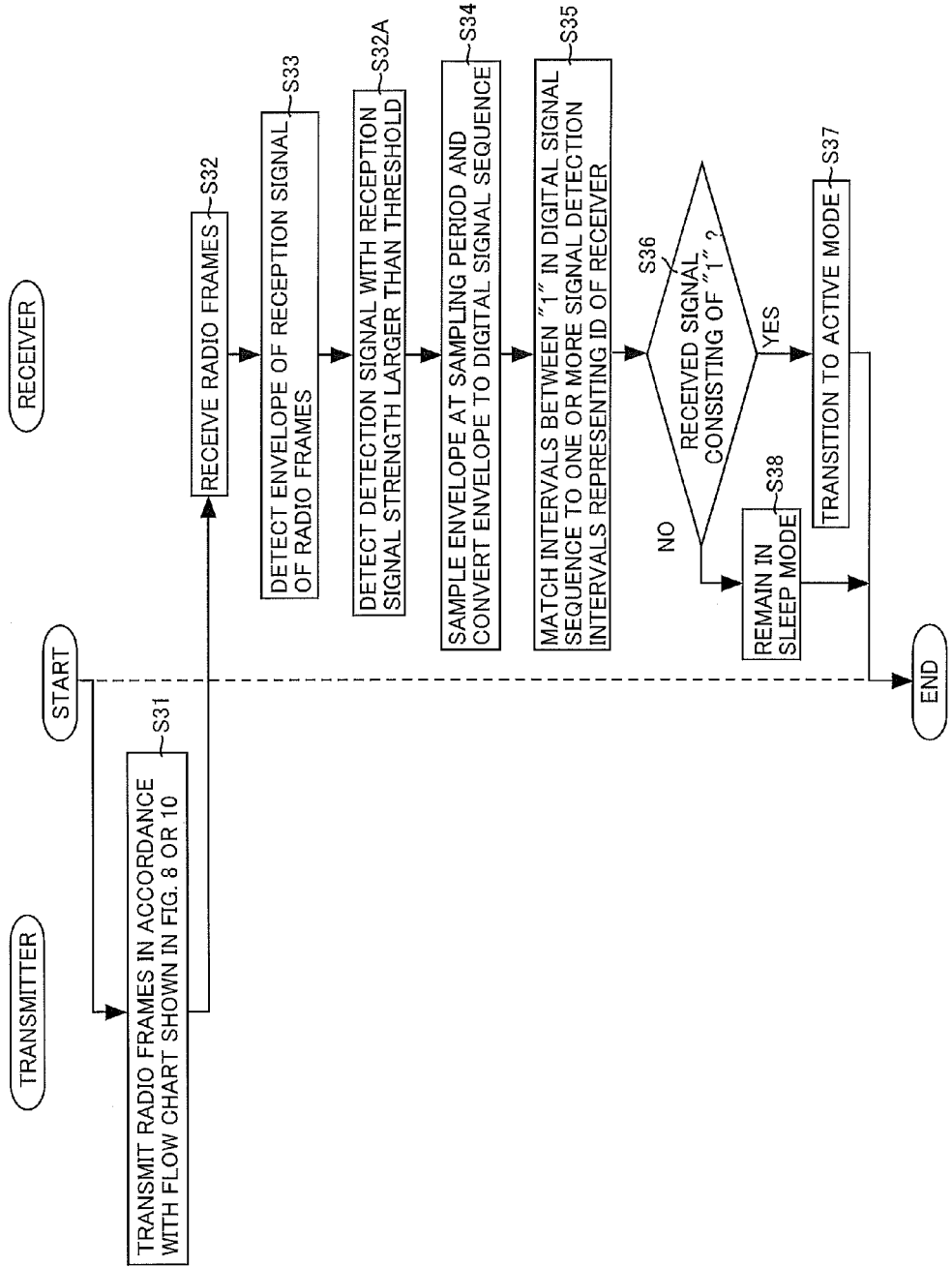
FIG. 18 is a flow chart showing the operation of the wireless communication system for causing the receiver shown in FIG. 16 to transition from sleep mode to active mode.

FIG. 18 is a flow chart showing the operation of the wireless communication system 10 for causing the receiver 2A shown in FIG. 16 to transition from sleep mode to active mode.

FIG. 18 illustrates the operation for causing the receiver 2A to transition from sleep mode to active mode when it is presupposed that the receiver 2A is in sleep mode and the switch 23 is connected to the terminal 24.

The flow chart shown in FIG. 18 is the same as the flow chart shown in FIG. 15 except that step S32A is added between steps S33 and S34 of the flow chart shown in FIG. 15.

Referring to FIG. 18, upon starting the operation for causing the receiver 2A to transition from sleep mode to active mode, steps S31 to S33, described above, are sequentially performed.

After the step S33, the strength detection circuit 32 of the receiver 2A detects the reception signal strength of the detected envelope received from the envelope detection circuit 26. Then, the strength detection circuit 32 compares the reception signal strength with the threshold TI to detect a detection signal having a reception signal strength larger than the threshold TI, and outputs it to the signal detection circuit 27.

Thereafter, the steps S34 to S38, as described above, are sequentially performed, and a series of operation ends.

Thus, the receiver 2A detects a detected signal having a reception signal strength larger than the threshold TI and determines whether the detected signal matches the ID of the receiver 2A, thereby determining whether the reception signal of a radio frame matches the ID of the receiver 2A while excluding interference frames transmitted from a radio apparatus EX other than the transmitter 1.

Figure 19:
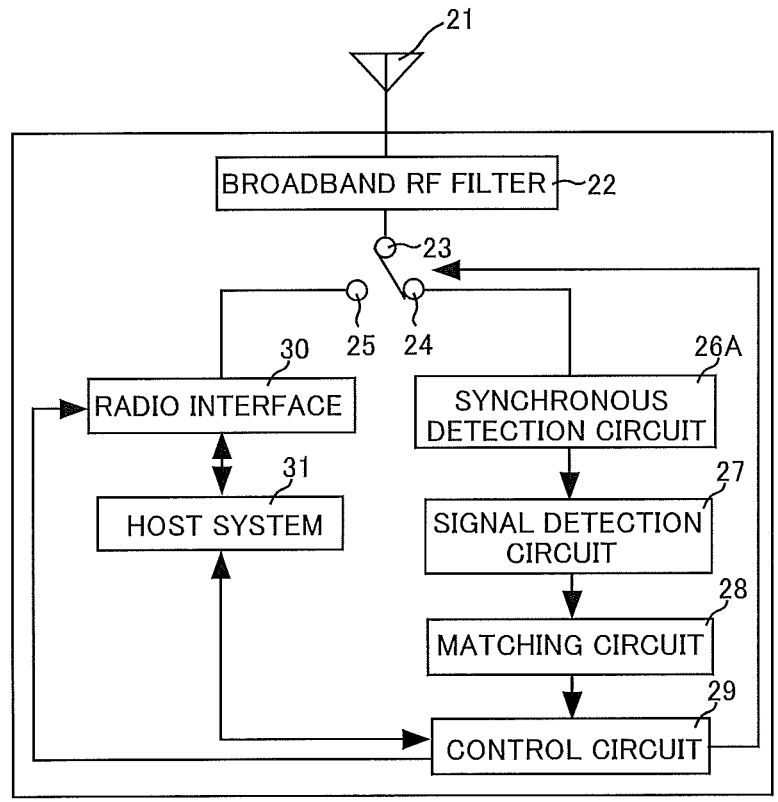
FIG. 19 is a schematic diagram of still another configuration of the receiver shown in FIG. 1.

FIG. 19 is a schematic diagram of still another configuration of the receiver 2 shown in FIG. 1. The wireless communication system 10 according to Embodiment 1 of the present invention may include a receiver 2B shown in FIG. 19 in place of the receiver 2.

Referring to FIG. 19, the receiver 2B is the same as the receiver 2 except that the envelope detection circuit 26 of the receiver 2 shown in FIG. 3 is replaced by the synchronous detection circuit 26A.

The synchronous detection circuit 26A receives a reception signal of a radio signal from the broadband RF filter 22 via the terminal 24 and detects the received reception signal in a synchronous manner. Then, the synchronous detection circuit 26A outputs the result of synchronous detection to the signal detection circuit 27.

Figure 20:
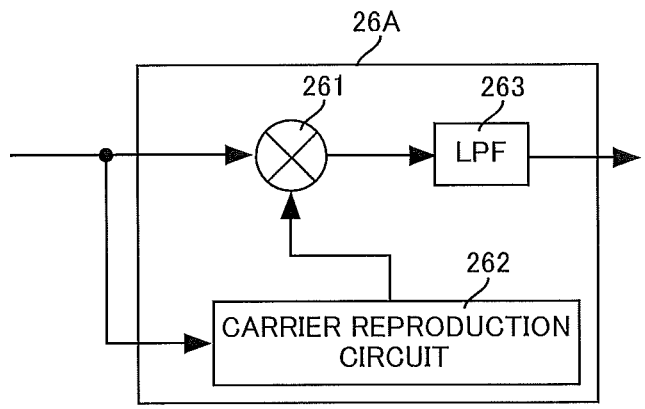
FIG. 20 is a conceptual diagram of the synchronous detection circuit shown in FIG. 19.

FIG. 20 is a conceptual diagram of the synchronous detection circuit 26A shown in FIG. 19. Referring to FIG. 20, the synchronous detection circuit 26A includes a multiplier 261, a carrier reproduction circuit 262 and a low pass filter (LPF: Low Pass Filter) 263.

The multiplier 261 receives a reception signal of a radio signal from the broadband RF filter 22 via the terminal 24 and receives a carrier from the carrier reproduction circuit 262. Then, the multiplier 261 multiplies the reception signal of the radio signal by the carrier, and outputs the multiplication result to the LPF 263.

The carrier reproduction circuit 262 receives a reception signal of a radio signal from the broadband RF filter 22 via the terminal 24 and, based on the reception signal of the radio signal received, reproduces the carrier. This carrier has the same frequency and phase as the carrier at the time when the radio signal was transmitted. Then, the carrier reproduction circuit 262 outputs the reproduced carrier to the multiplier 261.

The LPF 263 receives the multiplication result from the multiplier 261 and removes the high-pass components of the received multiplication result and outputs the low-pass components of the multiplication result as the detection result to the signal detection circuit 27.

In the receiver 2B, the signal detection circuit 27 samples the detection result from the synchronous detection circuit 26A at the sampling period and converts it to a digital signal sequence.

Thus, the receiver 2B detects a reception signal of a radio signal in a synchronous manner to convert the reception signal to a digital signal sequence.

Alternatively, the wireless communication system 10 according to Embodiment 1 may include a receiver in which the envelope detection circuit 26 of the receiver 2A shown in FIG. 16 is replaced by a synchronous detection circuit 26A.

Still alternatively, the wireless communication system 10 according to Embodiment 1 may include a receiver in which the envelope detection circuit 26 of the receiver 2 shown in FIG. 3 or the receiver 2A shown in FIG. 16 is replaced by a reproduction detection circuit.

The reproduction detection circuit receives a reception signal of a radio signal from the broadband RF filter 22 via the terminal 24, and detects the reception signal of the received radio signal using reproduction detection (Non-Patent Document 1). Then, the reproduction detection circuit outputs the detection result to the signal detection circuit 27. Further, the reproduction detection circuit receives from the strength detection circuit 32 a reception signal having a strength not less than a threshold and detects the received reception signal in a reproduction manner, and outputs the detection result to the signal detection circuit 27.

Thus, the wireless communication system 10 according to Embodiment 1 may include a receiver that detects a reception signal of a radio signal using envelope detection, synchronous detection or reproduction detection, and more generally, may include a receiver that detects a reception signal of a radio signal using any scheme.

Figure 21:
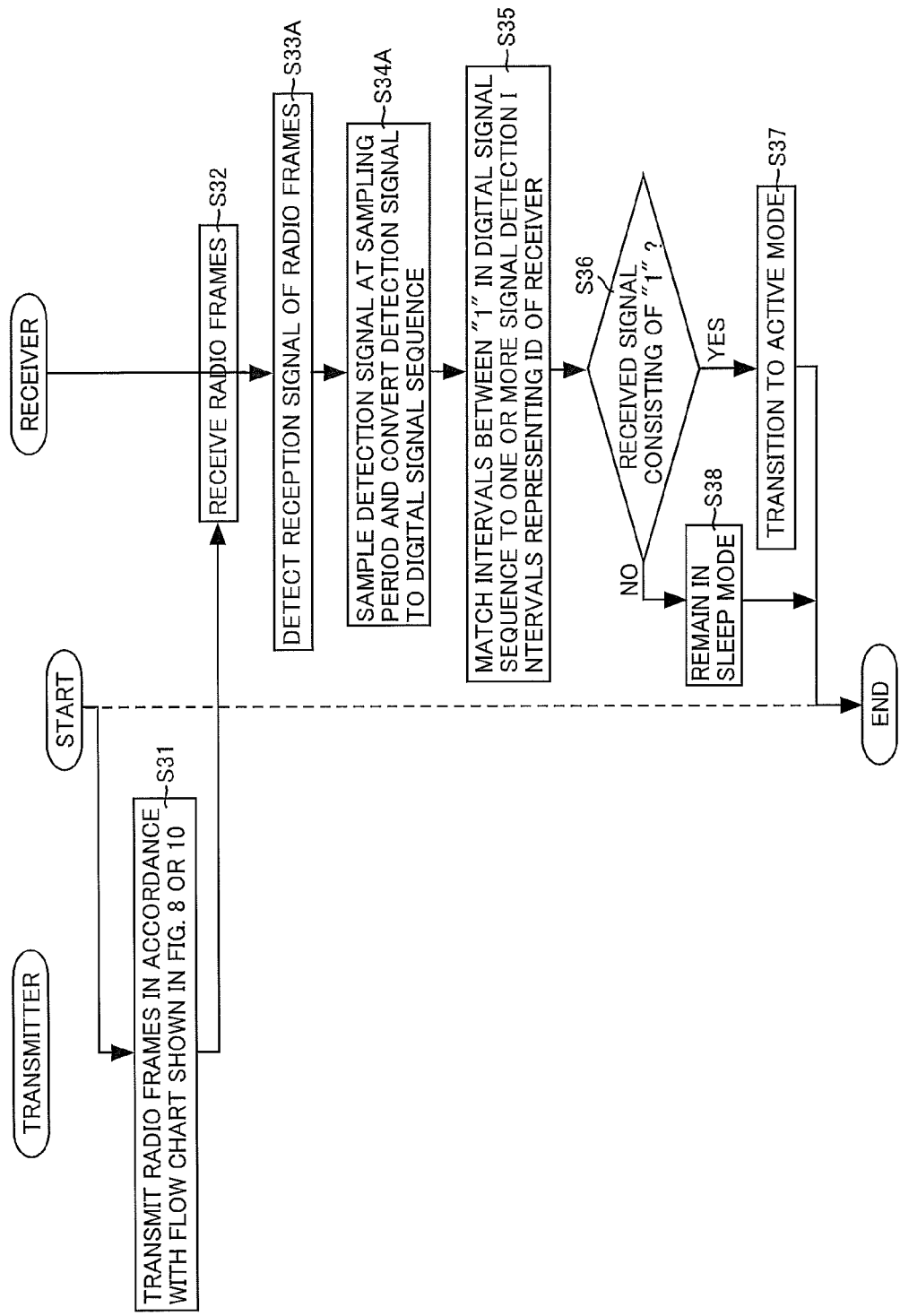
FIG. 21 is a flow chart showing another operation of the wireless communication system for causing the receiver to transition from sleep mode to active mode.

FIG. 21 is a flow chart showing another operation of the wireless communication system 10 for causing the receiver 2 to transition from sleep mode to active mode.

The flow chart shown in FIG. 21 is the same as the flow chart shown in FIG. 15 except that the steps S33 and S34 of the flow chart shown in FIG. 15 are replaced by steps S33A and 34A, respectively.

Referring to FIG. 21, upon starting the operation for causing the receiver 2 to transition from sleep mode to active mode, the steps S31 and S32, described above, are sequentially performed.

Then, after the step S32, the receiver 2 detects a reception signal of a radio frame (step S33A), and samples the detected signal at the sampling period to convert the detected signal to a digital signal sequence (step S34A).

Then, the steps S35 to S38, described above, are sequentially performed, and a series of operation ends.

In the wireless communication system 10, the operation for causing the receiver 2A shown in FIG. 16 to transition from sleep mode to active mode may be performed in accordance with the flow chart shown in FIG. 18 in which the steps S33 and 34 are replaced by the steps S33A and S34A, respectively, shown in FIG. 21.

As described above, in the wireless communication system 10 according to Embodiment 1, the transmitter 1 transmits a plurality of radio frames such that the signal detection intervals in the receiver 2, 2A or 2B form the ID of the receiver 2, 2A or 2B, and the receiver 2, 2A or 2B transitions from sleep mode to active mode when it detects the signal detection intervals that match its ID based on the reception signal of the radio signal received from the transmitter 1 or a radio apparatus other than the transmitter 1.

Thus, the receiver 2, 2A or 2B is prevented from failing to transition from sleep mode to active mode when there is an interference wave. That is, the desired control can be performed even if there is an interference wave.

In the above description, the signal detection circuit 27 detects a signal consisting of "1" at each of the detection timings DT1 to DT4; however, Embodiment 1 is not limited to such a configuration, and the signal detection circuit 27 may detect a signal with a value larger than the threshold Vth at each of the detection timings DT1 to DT4. That is, the signal detection circuit 27 may detect a signal with a value larger than the threshold Vth if a reception signal is present at each of the detection timings DT1 to DT4. A value larger than the threshold Vth is a positive integer.

A value larger than the threshold Vth is supplied to the matching circuit 28; even if a value larger than the threshold Vth is other than "1", the value larger than the threshold Vth is treated by the matching circuit 28 as a signal of H level.

In the above description, the transmission reference time is set to the transmission completion time for the first radio frame FR1; however, Embodiment 1 is not limited to such a configuration, and the transmission reference time may be set to any time.

[Embodiment 2]

Figure 22:
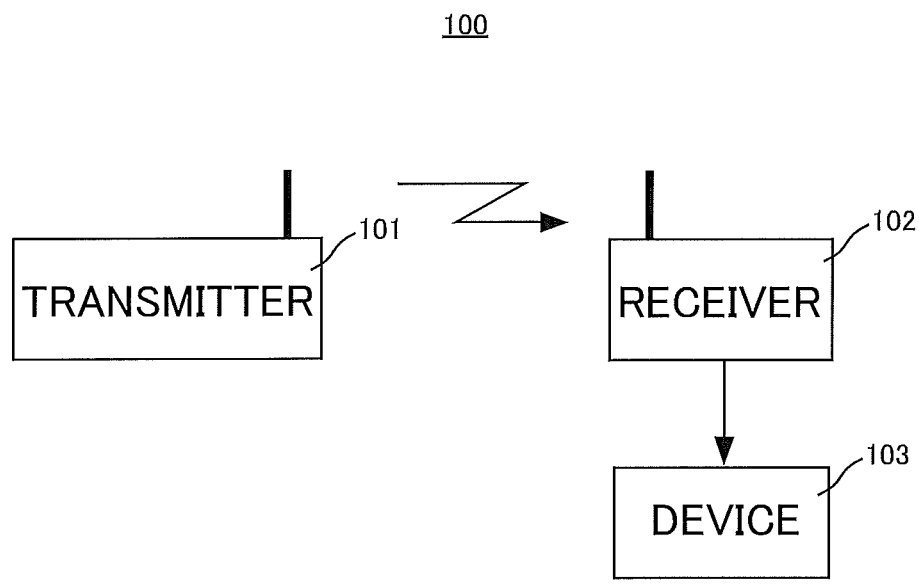
FIG. 22 is a schematic diagram of a wireless communication system according to Embodiment 2.

FIG. 22 is a schematic diagram of a wireless communication system according to Embodiment 2. Referring to FIG. 22, the wireless communication system 100 according to Embodiment 2 includes a transmitter 101, a receiver 102 and a device 103.

The transmitter 101 has the same configuration as the transmitter 1 of Embodiment 1. When controlling the device 103, the transmitter 101, in accordance with a CSMA/CA wireless communication scheme, transmits a radio frame to the receiver 102 in a desired frequency band including a plurality of frequency channels such that the one or more signal detection intervals that represent the ID (i.e. identifier) of the device 103 are detected by the receiver 102. The desired frequency band is the same as that described in Embodiment 1.

The receiver 102 holds the ID of the device 103. The receiver 102 receives radio frames from the transmitter 101 in the desired frequency band including a plurality of frequency channels and, if the received radio frames match the ID of the device 103, controls the device 103.

The device 103 is an electronic device that may be a light, speaker, monitor, camera or motor. The device 103 is controlled by the receiver 102. If the device 103 is a light, for example, it is controlled for on and off, or in brightness. If the device 103 is a speaker, it is controlled in volume.

Figure 23:
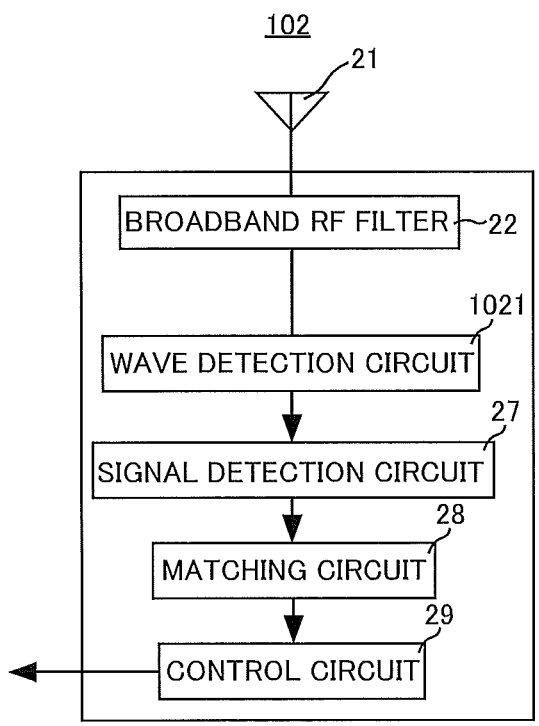
FIG. 23 is a schematic diagram of a configuration of the receiver shown in FIG. 22.

FIG. 23 is a schematic diagram of a configuration of the receiver 102 shown in FIG. 22. Referring to FIG. 23, the receiver 102 is the same as the receiver 2 shown in FIG. 3 except that the switch 23, the terminals 24 and 25, the radio interface 30 and the host system 31 are omitted and the envelope detection circuit 26 is replaced by a wave detection circuit 1021.

The wave detection circuit 1021 is located between the broadband RF filter 22 and the signal detection circuit 27. The wave detection circuit 1021 detects a reception signal using the envelope detection, the synchronous detection or the reproduction detection, described above, and outputs the detection result to the signal detection circuit 27.

The matching circuit 28 of the receiver 102 includes flip-flops that are connected in series to correspond to the signal detection intervals $[S_1 S_2 S_3 \ldots S_{k-1}]$ that represent the ID of the device 103. When the control circuit 29 of the receiver 102 receives the signal consisting of "1" from the matching circuit 28, it performs the desired control on the device 103.

Figure 24:
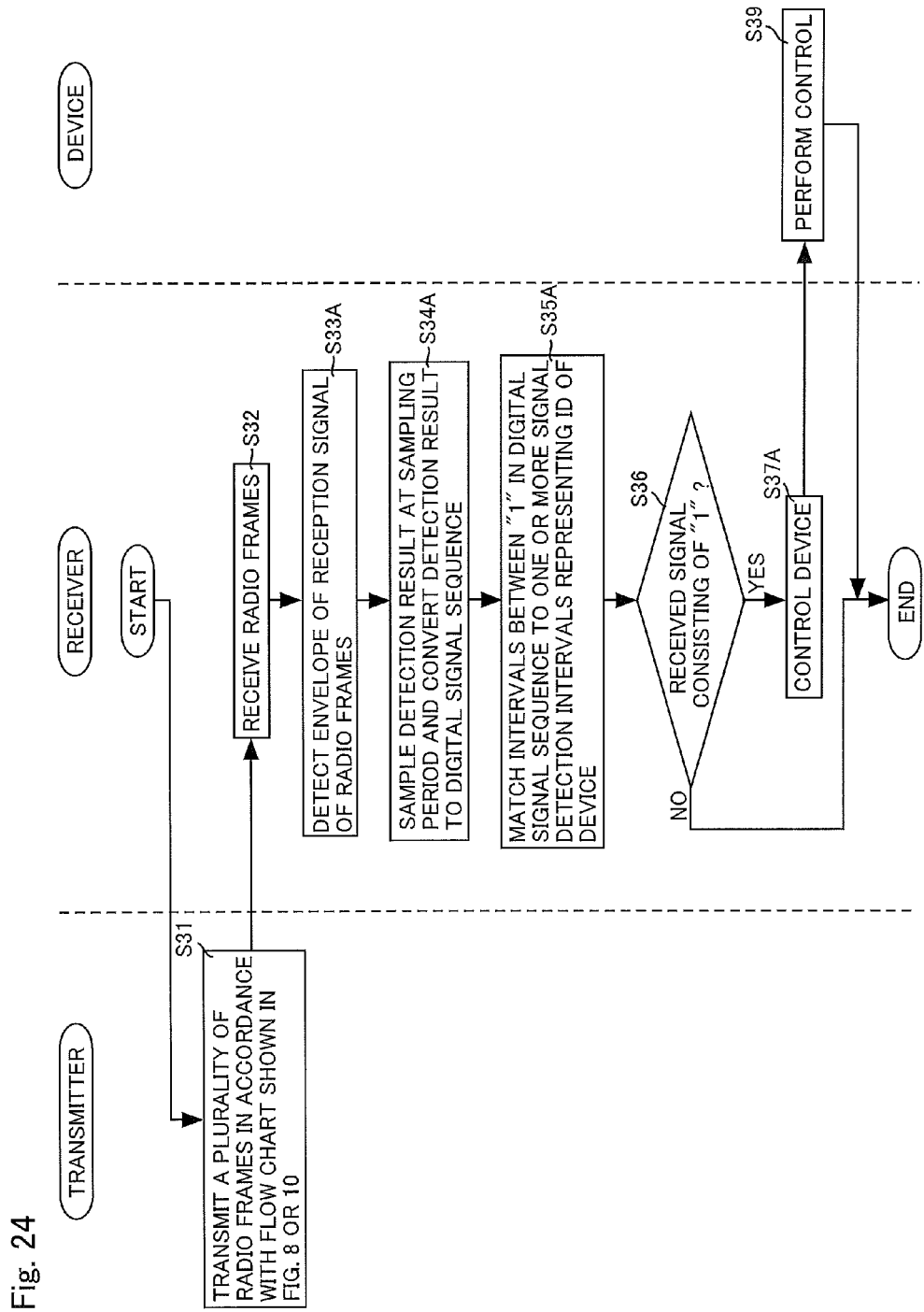
FIG. 24 is a flow chart showing the operation of the wireless communication system shown in FIG. 22.

FIG. 24 is a flow chart showing the operation of the wireless communication system 100 shown in FIG. 22.

The flow chart shown in FIG. 24 is the same as the flow chart shown in FIG. 21 except that steps S35 and S37 of the flow chart shown in FIG. 21 are replaced by steps S35A and S37A, respectively, the step S38 is omitted and step S39 is added.

Referring to FIG. 24, upon starting the operation of the wireless communication system 100, the transmitter 101 performs the step S31, described above, and the receiver 102 sequentially performs the steps S32, S33A and S34A, as described above. In this case, at the step S31, the transmitter 101 transmits a plurality of radio frames in accordance with the CSMA/CA wireless communication scheme such that the one or more signal detection intervals that represent the ID of the device 103 are detected by the receiving receiver 102. At the step S33A, the receiver 102 detects a reception signal of a radio signal using the envelope detection, the synchronous detection or the reproduction detection.

After the step S34A, the matching circuit 28 of the receiver 102 matches the intervals between "1" in the digital signal sequence to the one or more signal detection intervals that represent the ID of the device 103 (step S35A).

Thereafter, the receiver 102 performs the step S36, described above.

If it is determined at the step S36 that the signal consisting of "1" has not been received, a series of operation ends.

If it is determined at the step S36 that the signal consisting of "1" has been received, the control circuit 29 of the receiver 102 controls the device 103 (step S37A). For example, if the device 103 is a light, the control circuit 29 controls the light to be on, or controls the light to be off, or controls the light to be darkening.

Then, the device 103 operates in accordance with control by the control circuit 29 (step S39). More specifically, if the device 103 is a light, it goes on or off or brightens in accordance with control by the control circuit 29. Thus, a series of operation ends.

Thus, when the wireless communication space is available, the transmitter 101 transmits radio frames to the receiver 102 such that the one or more signal detection intervals representing the ID of the device 103 are detected by the receiver 102, and, when the wireless communication space is not available, it waits to transmit radio frames. When the wireless communication space is not available, a radio apparatus other than the transmitter 101 transmits radio frames. As a result, the receiver 102 receives radio frames from the transmitter 101 when the wireless communication space is available, and receives radio frames from a radio apparatus other than the transmitter 101 when the wireless communication space is not available. Then, the receiver 102 detects a signal consisting of a value larger than the threshold Vth at a detection timing for detecting one of the one or more signal detection intervals that represent the identifier of the device 103 to determine that the reception signal matches the identifier of the device 103, and controls the device 103. The operations of the device 103 may vary depending on the specific example of the device 103, and may be various operations such as "on", "off" and "brighten" in one specific example of the device 103. The control circuit 29 of the receiver 102 selects a desired one from these various operations and controls the device 103 so as to perform the selected operation.

Thus, the desired control can be performed even if there is an interference wave.

Alternatively, in Embodiment 2, the wireless communication system 100 may include, in place of the receiver 102, a receiver having the arrangement of the receiver 102 and the strength detection circuit 32 added thereto.

The other description for Embodiment 2 is the same as that for Embodiment 1.

[Embodiment 3]

Figure 25:
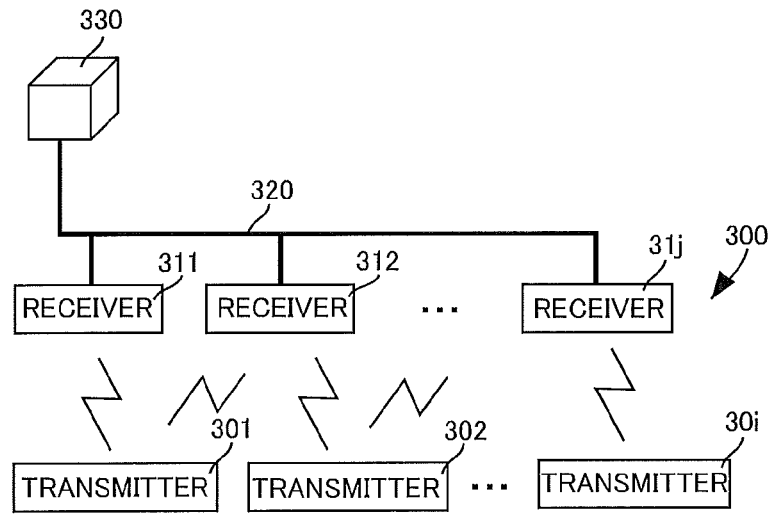
FIG. 25 is a schematic diagram of a wireless communication system according to Embodiment 3.

FIG. 25 is a schematic diagram of a wireless communication system according to Embodiment 3. Referring to FIG. 25, the wireless communication system 300 according to Embodiment 3 includes transmitters 301 to 30$i$ (i is an integer not less than 1) and receivers 311 to 31$j$ (j is an integer not less than 1).

The wireless communication system 300 may be located in a hospital, for example.

The receivers 311 to 31$j$ are connected to a server 330 via a cable 320. The receivers 311 to 31$j$ are located at predetermined positions and spaced apart from each other at a desired distance.

Each of the transmitters 301 to 30$i$ broadcast a plurality of radio frames in a certain cycle such that the pattern of signal detection intervals $[S_1 S_2 S_3 \ldots S_{k-1}]$ representing its ID can be detected by a receiver (i.e. one of the receivers 311 to 31$j$). The certain cycle may be 10 minutes, for example. Each of the transmitters 301 to 30$i$ may be carried by a staffer of the hospital, for example.

Each of the receivers 311 to 31$j$ holds in advance the IDs of all the transmitters 301 to 30$i$. Then, when each of the receivers 311 to 31$j$ receives a plurality of radio frames from one of the transmitters 301 to 30$i$ and determines that the reception signal of the received radio frames matches the ID of a transmitter (i.e. the ID of one of the transmitters 301 to 30$i$), then, it transmits its own ID and the ID of the transmitter (i.e. the ID of one of the transmitters 301 to 30$i$) to the server 330 via the cable 320.

The server 330 stores the IDs of the receivers 311 to 31$j$ and the positions of the receivers 311 to 31$j$ in an associated manner. The server 330 stores the IDs of the transmitters 301 to 30$i$ and the names of the staffers in an associated manner. When the server 330 receives from a receiver (one of the receivers 311 to 31$j$) the ID of a receiver (i.e. the ID of one of the receivers 311 to 31$j$) and the ID of a transmitter (i.e. the ID of one of the transmitters 301 to 30$i$), it detects the position information associated with the received ID of the receiver and detects the name of the staffer associated with the ID of the transmitter, and displays the detected name of staffer and the position information in an associated manner. The server 330 performs this operation each time it receives the ID of the receiver and the ID of the transmitter.

Figure 26:
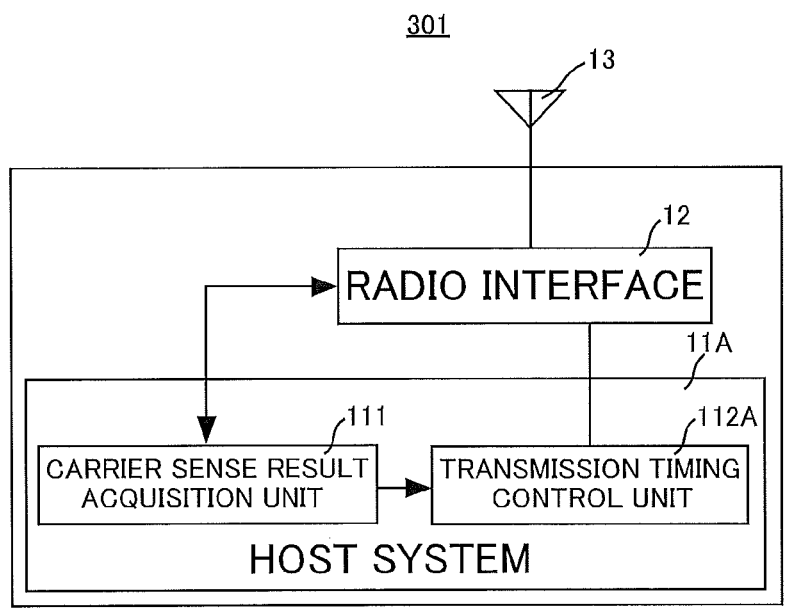
FIG. 26 is a schematic diagram of a configuration of the transmitter shown in FIG. 25.

FIG. 26 is a schematic diagram of a configuration of the transmitter 301 shown in FIG. 25. Referring to FIG. 26, the transmitter 301 is the same as the transmitter 1 except that the host system 11 of the transmitter 1 shown in FIG. 2 is replaced by the host system 11A.

The host system 11A holds in advance the ID of a device 103. If the wireless communication space is available as a result of the carrier sensing, the host system 11A controls the radio interface 12 to transmit one radio frame that constitutes one of the one or more signal detection intervals that represent the ID of the device 103, and, when the wireless communication space is not available, it controls the radio interface 12 to wait to transmit the one radio frame.

The host system 11A is the same as the host system 11 except that the transmission timing control unit 112 of the host system 11 shown in FIG. 2 is replaced by a transmission timing control unit 112A.

The transmission timing control unit 112A receives the result of carrier sensing from the carrier sense result acquisition unit 111 and performs transmission control based on the received result of carrier sensing and controls the timing for transmitting radio frames in the radio interface 12 based on the ID of the transmitter 301, and, if it determines based on the result of carrier sensing that the wireless communication space is available at a time when a radio frame is to be transmitted, transmits a radio frame. When the transmission timing control unit 112A determines based on the result of carrier sensing that the wireless communication space is not available at a time when a radio frame is to be transmitted, it does not transmit a radio frame in the radio interface 12.

Each of the transmitters 302 to 30i shown in FIG. 25 has the same configuration as the transmitter 301 shown in FIG. 26.

Figure 27:
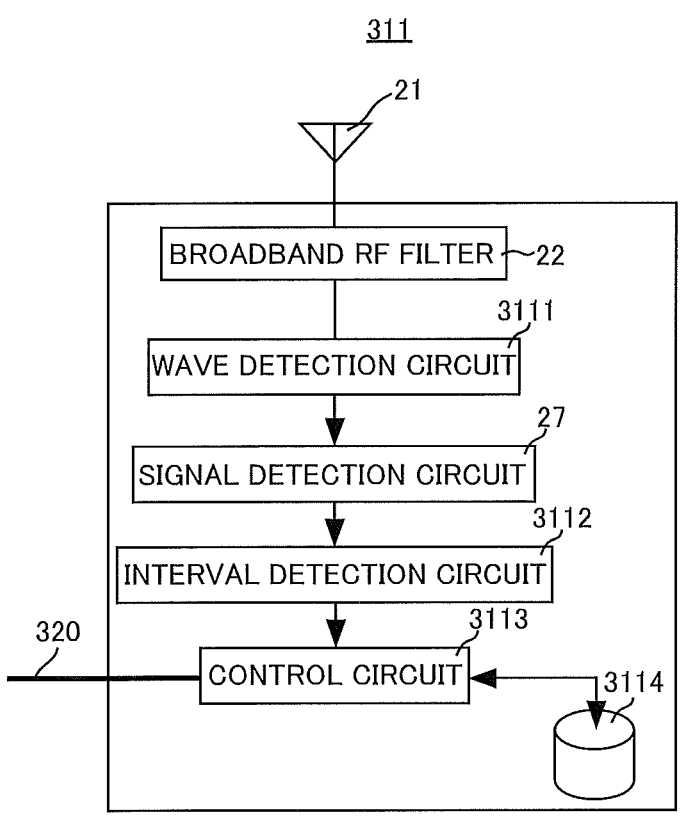
FIG. 27 is a schematic diagram of a configuration of the receiver shown in FIG. 25.

FIG. 27 is a schematic diagram of a configuration of the receiver 311 shown in FIG. 25. Referring to FIG. 27, the receiver 311 is the same as the receiver 2 shown in FIG. 3 except that the switch 23, the terminals 24 and 25, the radio interface 30 and the host system 31 are omitted, the envelope detection circuit 26 is replaced by a wave detection circuit 3111, the matching circuit 28 is replaced by an interval detection circuit 3112, the control circuit 29 is replaced by a control circuit 3113 and a storage means 3114 is added.

The wave detection circuit 3111 is located between the broadband RF filter 22 and the signal detection circuit 27. The wave detection circuit 3111 detects a reception signal using the envelope detection, the synchronous detection or the reproduction detection, described above, and outputs the detection result to the signal detection circuit 27.

The interval detection circuit 3112 receives a digital signal sequence from the signal detection circuit 27, counts the number of "0" between "1" and "1" in the received digital signal sequence and, based on the counted number of "0", detects one or more signal detection intervals. Then, the interval detection circuit 3112 outputs the detected one or more signal detection intervals to the control circuit 3113.

The control circuit 3113 holds the ID of the receiver 311. The control circuit 3113 receives one or more signal detection intervals from the interval detection circuit 3112. Then, the control circuit 3113 searches the storage means 3114 for the ID of the transmitter that matches the received one or more signal detection intervals. If the control circuit 3113 finds the ID of the transmitter that matches the one or more signal detection intervals as a result of searching, it transmits the ID of the transmitter that has been found and the ID of the receiver 311 to the server 330 via the cable 320.

If the control circuit 3113 does not find the ID of the transmitter that matches the one or more signal detection intervals, it discards the one or more signal detection intervals.

The storage means 3114 stores the IDs of all the transmitters 301 to 30i.

Each of the receivers 312 to 31j shown in FIG. 25 has the same configuration as the receiver 311 shown in FIG. 27.

Figure 28:
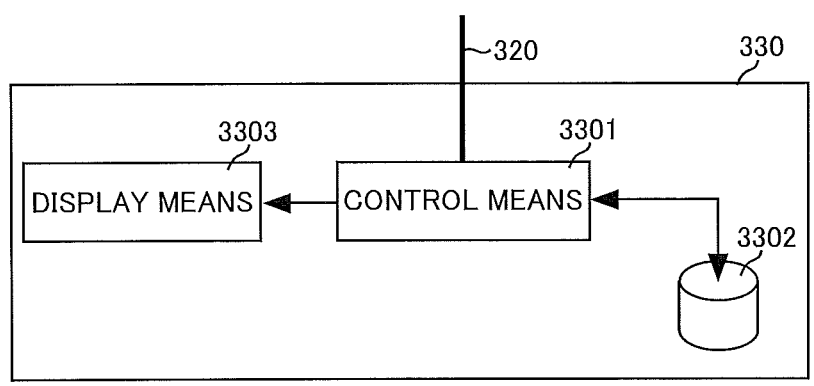
FIG. 28 is a schematic diagram of a configuration of the server shown in FIG. 25.

FIG. 28 is a schematic diagram of a configuration of the server 330 shown in FIG. 25. Referring to FIG. 28, the server 330 includes a control means 3301, a storage means 3302 and a display means 3303.

The control means 3301 receives, via the cable 320, the ID of a transmitter (i.e. the ID of one of the transmitters 301 to 30i) and the ID of a receiver (i.e. the ID of one of the receivers 311 to 31j).

The control means 3301 searches the storage means 3302 to find in the storage means 3302 the position information associated with the ID of the receiving receiver. When the control means 3301 finds the position information, it searches the storage means 3302 to find the name of the staffer associated with the ID of the transmitter. Then, the control means 3301 acquires the current time from an incorporated timer and associates the current time, the position information and the name of the staffer with one another, and outputs the associated current time, position information and staffer name to the display means 3303.

The storage means 3302 stores the IDs of the receivers and the position information of the receivers in an associated manner. The storage means 3302 stores the IDs of the transmitters and the names of the staffer in an associated manner.

The display means 3303 receives the associated current time, position information and name of the staffer from the control means 3301, and displays the received current time, position information and name of the staffer in an associated manner.

Figure 29:
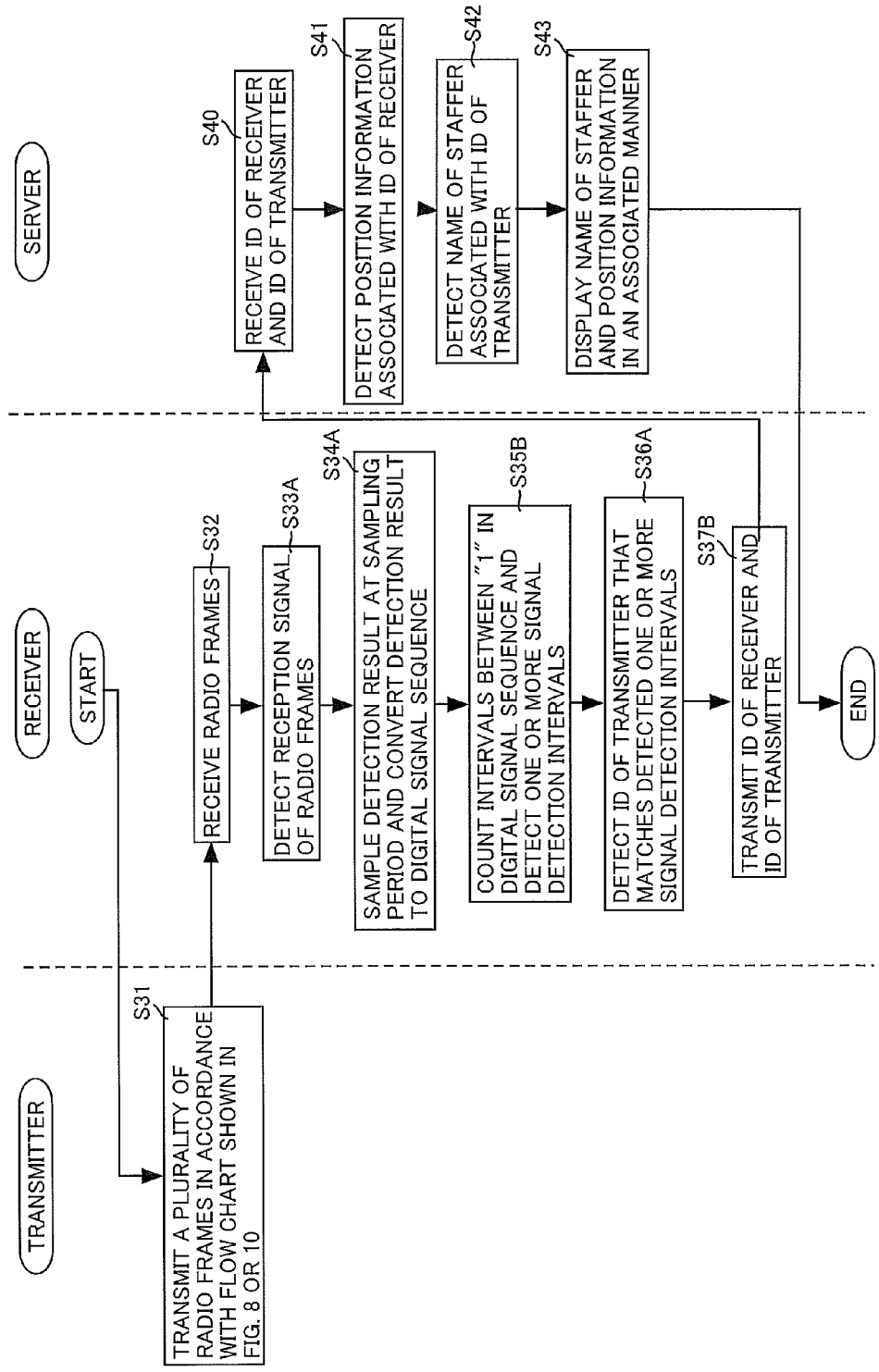
FIG. 29 is a flow chart showing the operation of the wireless communication system shown in FIG. 25.

FIG. 29 is a flow chart showing the operation of the wireless communication system 300 shown in FIG. 25.

FIG. 29 illustrates the operation of the wireless communication system 300 in an example where the transmitter 301 shown in FIG. 25 transmits the one or more signal detection intervals that represent its ID and the receiver 312 detects these signal detection intervals.

The flow chart shown in FIG. 29 is the same as the flow chart shown in FIG. 24 except that steps the S35A, S36 and S37A of the flow chart shown in FIG. 24 are replaced by steps S35B, S36A and S37B, and the step S39 is replaced by steps S40 to S43.

Referring to FIG. 29, upon starting a series of operation, the transmitter 301 performs step the S31, described above. In this case, the transmitter 301 broadcasts a plurality of radio frames such that the one or more signal detection intervals that represent its own ID can be detected by the receiver 312.

Then, the receiver 312 sequentially performs the steps S32, S33A and S34A, described above.

After the step S34A, the interval detection circuit 3111 of the receiver 312 counts the number of "0" between "1" and "1" in the digital signal sequence received from the signal detection circuit 27 and, based on the counted number of "0", detects the one or more signal detection intervals (step S35B). Then, the interval detection circuit 3112 of the receiver 312 outputs the detected one or more signal detection intervals to the control circuit 3113.

When the control circuit 3113 receives the one or more signal detection intervals from the interval detection circuit 3112, it searches the storage means 3114 to find the ID of the transmitter 301 that matches the received one or more signal detection intervals (step S36A).

Then, the control means 3112 of the receiver 312 transmits its own ID (i.e. the ID of the receiver 312) and the ID of the transmitter 301 to the server 330 via the cable 320 (step S37B).

The control means 3301 of the server 330 receives the ID of the receiver 312 and the ID of the transmitter 301 (step S40). Then, the control means 3301 of the server 330 searches the storage means 3302 and detects the position information associated with the received ID of the receiver (step S41).

Then, the control means 3301 of the server 330 searches the storage means 3302 and detects the name of the staffer associated with the ID of the transmitter 301 (step S42).

Then, the control means 3301 of the server 330 acquires the current time from an incorporated timer, associates the current time, the name of the staffer and the position information with one another and outputs it to the display means 3303, and the display means 3303 displays the current time, the name of the staffer and the position information in an associated manner (step S43). Thus, a series of operation ends.

The operation of the wireless communication system 300 is also performed in accordance with the flow chart shown in FIG. 29 if the one or more signal detection intervals representing the ID of the transmitter 301 are detected by one of the receivers 311, 313 to 31j other than the receiver 312.

The operation of the wireless communication system 300 is also performed in accordance with the flow chart shown in FIG. 29 if the one or more signal detection intervals representing the ID of one of the transmitters 302 to 30i other than the transmitter 301 are detected by one of the receivers 311 to 31j.

Steps S31, S32, S33A, S34A, S35B, S36A, S37B, S40 to S43 shown in FIG. 29 are repeated in a certain cycle. Each of the transmitters 301 to 30i broadcasts, in a certain cycle, a plurality of radio frames such that the one or more signal detection intervals that represent its own ID can be detected by a receiver (i.e. one of the receivers 311 to 31j) (step S31). As such, the server 330 displays the position information of each staffer at the current time in a certain cycle. This can provide understanding of where each staffer of the hospital is at an each time.

In accordance with the flow chart shown in FIG. 29, a receiver may transmit its own ID (i.e. the ID of a receiver) and the ID of a transmitter to the server 330 such that the operation of the server 330 (the steps S40 to S43) is performed. Then, the server 330 displays the name of the staffer associated with the ID of the transmitter in such a way that this name appears to be associated with the position information of this staffer. As such, if a receiver transmits its own ID (i.e. the ID of a receiver) and the ID of a transmitter to the server 330, the operation of the server 330 is performed; if a receiver does not transmit its own ID (i.e. the ID of a receiver) and the ID of a transmitter to the server 330, the operation of the server 330 is not performed. This is equivalent to turning a light on or off, for example.

Thus, that a receiver transmits its own ID (i.e. the ID of a receiver) and the ID of a transmitter to the server 330 is equivalent to that the receiver controls the operation of the server 330.

As described above, in the flow chart shown in FIG. 29, when the wireless communication space is available, each of the transmitters 301 to 30i broadcasts radio frames such that the signal detection intervals representing its own ID are detected by one of the receivers 311 to 31j, and, when the wireless communication space is not available, each of the transmitters 301 to 30i waits to transmit radio frames. When the wireless communication space is not available, a radio apparatus other than the transmitters 301 to 30i transmits radio frames. As such, each of the receivers 311 to 31j receives radio frames from each of the transmitters 301 to 30i when the wireless communication space is available, and receives radio frames from a radio apparatus other than the transmitters 301 to 30i when the wireless communication space is not available. Then, if one or more signal detection intervals detected based on the received radio frames match the ID of a transmitter (i.e. one of the transmitters 301 to 30i), the each of the receivers 311 to 31j transmits its own ID (i.e. the ID of a receiver) and the ID of the transmitter to the server 330 and controls the operation of the server 330.

Thus, the desired control can be performed even if there is an interference wave.

In Embodiment 3, the wireless communication system 300 may include, in place of the receivers 311 to 31j, j receivers each having the arrangement of the respective one of the receiver 311 to 31j and a strength detection circuit 32 added thereto. In this case, the operation in the wireless communication system 300 is performed in accordance with the flow chart shown in FIG. 29 with the step S32A (see FIG. 18), described above, added between the steps S32 and S33A.

Embodiment 3 is not limited to the wireless communication system 300 being located in a hospital; the system may be located in a commercial building and, generally, may be located in facilities where a plurality of persons are active.

In Embodiment 3, one transmitter and one receiver are sufficient for the receiver to control the operation of the server 330; thus, the wireless communication system 300 of Embodiment 3 may suitably include transmitters 301 to 30i (i is an integer not less than 1) and receivers 311 to 31j (j is an integer not less than 1), as described above.

The other description for Embodiment 3 is the same as that for Embodiment 1.

In the above description of Embodiment 1, the transmitter 1 transmits a plurality of radio frames such that the one or more signal detection intervals representing the ID of a receiver 2 that is intended to transition from sleep mode to active mode are detected by the receiver 2, and, if the reception signal of the radio frames received from the transmitter 1 matches the ID of the receiver 2, the receiver 2 transitions from sleep mode to active mode. That is, in the above description, the receiver 2 controls its own operation.

In the above description of Embodiment 2, the transmitter 101 transmits a plurality of radio frames such that the one or more signal detection intervals representing the ID of the device 103 are detected by the receiver 102, and, if the reception signal of the radio frames received from the transmitter 101 matches the ID of the device 103, the receiver 102 controls various operations of the device 103. That is, in the above description, the receiver 2 controls the operation of the device 103, which is different from itself.

In the above description of Embodiment 3, each of the transmitters 301 to 30i transmits a plurality of radio frames such that the one or more signal detection intervals representing its own ID (i.e. the ID of a transmitter) are detected by a receiver (i.e. one of the receivers 311 to 31j), and, if the reception signal of the radio frames received from the transmitter (i.e. one of the transmitters 301 to 30i) matches the ID of the transmitter (i.e. one of the transmitters 301 to 30i), each of the receivers 311 to 31j controls the server 330 to display the name of the staffer associated with the ID of the transmitter (i.e. one of the transmitters 301 to 30i) and the positional information in an associated manner. That is, in the above description, each of the receivers 311 to 31j controls the operation of the server 330, which is different from itself.

Accordingly, the transmitter according to an embodiment of the present invention may perform, each time executing carrier sensing, a transmission process where the transmitter transmits, in the desired frequency band, one radio frame such that a time interval between detection timings of a radio frame in a radio apparatus of a receiver constitutes one or more of one or more signal detection intervals representing an identifier when the wireless communication space is available as a result of the carrier sensing, and waits to transmit the one radio frame when the wireless communication space is not available as a result of the carrier sensing.

The transmission method according to an embodiment of the present invention transmits a radio frame in accordance with a wireless communication scheme where a transmitter performs carrier sensing and transmits a radio signal when a wireless communication space is available and waits to transmit the wireless signal when the wireless communication space is not available, and may include a first step performing carrier sensing in a desired frequency band including a plurality of frequency channels, and a second step performing, each time executing carrier sensing, a transmission process where the transmitter transmits, in the desired frequency band, one radio frame such that a time interval between detection timings of a radio frame in a radio apparatus of a receiver constitutes one or more of one or more signal detection intervals representing an identifier when the wireless communication space is available as a result of the carrier sensing, and waits to transmit the one radio frame when the wireless communication space is not available as a result of the carrier sensing.

The receiver according to an embodiment of the present invention may detect a reception signal of a radio frame transmitted by the transmitter and perform the desired control when one or more signal detection intervals detected based on the digital signal sequence derived from the detected signal match an identifier.

It should be understood that the embodiments disclosed herein are exemplary in every respect and not limitative. The scope of the present invention is not defined by the embodiments described above but the claims, and is intended to cover all the modifications in the spirit and scope equivalent to those of the claims.

INDUSTRIAL APPLICABILITY

The present invention is useful in a transmitter, a transmission method used by the same, a receiver for receiving a radio signal from the transmitter and a wireless communication system including the same.

The invention claimed is:

1. A transmitter transmitting a radio frame in accordance with a wireless communication scheme where the transmitter performs carrier sensing and transmits a radio signal when a wireless communication space is available and waits to transmit the radio signal when the wireless communication space is not available, comprising:
a carrier sensing unit that performs carrier sensing in a desired frequency band including a plurality of frequency channels, and
a transmitting unit that performs, each time executing carrier sensing, a transmission process where:
(1) when the wireless communication space is available as a result of the carrier sensing by the carrier sensing unit, the transmitting unit transmits, in the desired frequency band, one radio frame such that a receiver-side radio apparatus receives a radio frame at a reception timing determined by one or more unit signal detection intervals representing an identifier for the receiver-side radio apparatus, the identifier being defined by using one or more unit signal detection intervals, each of which is a time interval between detection timings of a radio frame, and
(2) when the wireless communication space is not available as a result of the carrier sensing, the transmitting unit waits to transmit the one radio frame.

2. The transmitter according to claim 1, wherein, when the wireless communication space is available, the transmitting unit transmits the one radio frame such that a detection timing at which the radio apparatus detects the identifier is included in a period defined by the one radio frame.

3. The transmitter according to claim 2, wherein the transmitting unit determines a transmission timing of the one radio frame based on an arbitrary reference time and to transmit the one radio frame at the determined transmission timing.

4. The transmitter according to claim 2, wherein, when the wireless communication space is available, the transmitting unit transmits the one radio frame having a frame length corresponding to a maximum delay time in the wireless communication scheme plus a sampling period of the radio apparatus in such a way that the detection timing of the identifier is included in a period defined by the one radio frame.

5. The transmitter according to claim 4, wherein the transmitting unit transmits the one radio frame when a time corresponding to at least one signal detection interval passes after a transmission starting time for a first radio frame.

6. A wireless communication system comprising:
the transmitter according to claim 1.

7. A transmission method transmitting a radio frame in accordance with a wireless communication scheme where a transmitter performs carrier sensing and transmits a radio signal when a wireless communication space is available and waits to transmit the wireless signal when the wireless communication space is not available, comprising:
a first step performing carrier sensing in a desired frequency band including a plurality of frequency channels; and
a second step performing, each time carrier sensing is performed, a transmission process where:
(1) when the wireless communication space is available as a result of the carrier sensing, the second step includes transmitting, in the desired frequency band, one radio frame such that a receiver-side radio apparatus receives a radio frame at a reception timing determined by one or more unit signal detection intervals representing an identifier for the receiver-side radio apparatus, the identifier being defined by using one or more unit signal detection intervals, each of which is a time interval between detection timings of a radio frame, and (2) when the wireless communication space is not available as a result of the carrier sensing, the second step includes waiting to transmit the one radio frame.

8. The transmission method according to claim 7, wherein, in the second step, the one radio frame is transmitted such that a detection timing of the identifier is included in a period defined by the one radio frame.

9. The transmission method according to claim 8, wherein, in the second step, the one radio frame is transmitted at a transmission timing determined based on an arbitrary reference time.

10. The transmission method according to claim 8, wherein, when the wireless communication space is available, in the second step, the one radio frame is transmitted in such a way that a detection timing of the identifier is included in a period defined by the one radio frame, where the one radio frame has a frame length defined by a maximum delay time in the wireless communication scheme plus a sampling period of the radio apparatus.

11. The transmission method according to claim 10, wherein, when the wireless communication space is available, in the second step, the one radio frame is transmitted when a time corresponding to at least one signal detection interval passes after a transmission initiation time for a first radio frame.

12. A receiver comprising:
a filter that passes a reception signal of a radio frame that is in a desired bandwidth including a plurality of frequency channels;
a wave detecting unit that detects the reception signal that has passed through the filter;
a converting unit that samples a detection result by the wave detecting unit at a sampling period and to convert the detection result to a digital signal sequence; and
a control unit that performs desired control when an identifier determined by one or more signal detection intervals detected based on the digital signal sequence matches an identifier for the receiver, the identifier being defined by using one or more unit signal detection intervals, each of which is a time interval between detection timings of a radio frame.

13. The receiver according to claim 12, wherein the control unit includes:
a matching circuit that outputs a signal indicating that the identifier has been received when it determines, based on the digital signal sequence, that a signal consisting of a value larger than a first threshold was detected at every one of a plurality of detection timings that detect one or more signal detection intervals representing an identifier; and
a control circuit that performs the desired control when it has received a signal indicating that it has received the identifier from the matching circuit.

14. The receiver according to claim 12, further comprising: a detecting unit that detects a wave detection signal having a reception signal strength that is larger than a second threshold based on the detection result by the wave detecting unit and to output the detected wave detection signal to the converting unit,
wherein the converting unit samples the wave detection signal from the detecting unit at a sampling period and converts the wave detection signal to a digital signal sequence.

15. A wireless communication system comprising:
the receiver according to claim 12.

* * * * *